US012574935B2

(12) United States Patent (10) Patent No.: US 12,574,935 B2
Khoshnevisan et al. (45) Date of Patent: Mar. 10, 2026

(54) DOWNLINK CONTROL INFORMATION (DCI) FOR SINGLE DCI AND MULTIPLE DCI TRANSMISSION MODES

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 612 days.

(21) Appl. No.: 17/936,704

(22) Filed: Sep. 29, 2022

(65) Prior Publication Data

US 2024/0121789 A1 Apr. 11, 2024

(51) Int. Cl.
*H04W 72/23* (2023.01)

(52) U.S. Cl.
CPC .................................. *H04W 72/23* (2023.01)

(58) Field of Classification Search
CPC ..... H04L 5/001; H04L 5/0023; H04L 5/0051; H04L 5/0053; H04W 72/23
See application file for complete search history.

(56) References Cited

U.S. PATENT DOCUMENTS 9,955,465 B2 * 4/2018 He ......................... H04L 5/0094
10,517,067 B2 * 12/2019 Islam ..................... H04W 72/23

| 11,323,992 | B2 * | 5/2022 | Zhuang | ............... | H04W 72/044 |
| 11,800,555 | B2 * | 10/2023 | Park | ....................... | H04W 72/51 |
| 11,838,100 | B2 * | 12/2023 | Tseng | .................... | H04W 72/23 |
| 12,069,715 | B2 * | 8/2024 | Park | ....................... | H04B 7/0689 |
| 12,250,632 | B2 * | 3/2025 | Murray | ................. | H04W 72/23 |
| 2007/0124425 | A1 | 5/2007 | Gross | | |

(Continued)

FOREIGN PATENT DOCUMENTS

| AU | 2019248382 A1 * | 10/2020 | ............ | H04W 72/23 |
| AU | 2019248382 B2 * | 12/2022 | ............ | H04W 72/23 |

(Continued)

OTHER PUBLICATIONS

Intel Corporation, UL precoding indication for multi-panel transmission, May 9, 2022, 3GPP TSG RAN WG1 #109-e, Agenda Item: 9.1.4.1, Tdoc: R1-2204790 (Year: 2022).*

(Continued)

*Primary Examiner* — Eric Nowlin

(74) *Attorney, Agent, or Firm* — QUALCOMM Incorporated

(57) ABSTRACT

Various aspects of the present disclosure generally relate to wireless communication. In some aspects, a user equipment (UE) may receive, from a network node, configuration information indicating a configuration of at least two sounding reference signal resource sets. The UE may receive one or more downlink control information (DCI) communications associated with one or more uplink communications. The UE may receive, from the network node, an indication of whether the one or more DCI communications are associated with one or both of a single DCI (sDCI) mode or a multiple DCI (mDCI) mode, wherein the indication is based at least in part on the configuration information. Numerous other aspects are described.

30 Claims, 17 Drawing Sheets

(56) References Cited

U.S. PATENT DOCUMENTS

| | | | | |
|---|---|---|---|---|
| 2016/0100382 A1* | 4/2016 | He | H04L 5/001 370/329 |
| 2019/0305867 A1* | 10/2019 | Tseng | H04J 11/0079 |
| 2019/0313365 A1* | 10/2019 | Islam | H04W 48/12 |
| 2020/0196285 A1* | 6/2020 | Zhuang | H04L 5/0053 |
| 2020/0267026 A1* | 8/2020 | Manolakos | H04W 72/23 |
| 2021/0014931 A1* | 1/2021 | Noh | H04L 5/0035 |
| 2021/0321442 A1* | 10/2021 | Jung | H04L 5/005 |
| 2022/0070855 A1* | 3/2022 | Zhang | H04W 72/51 |
| 2022/0132534 A1* | 4/2022 | Jang | H04L 5/0051 |
| 2022/0191793 A1* | 6/2022 | Murray | H04W 52/0232 |
| 2023/0061346 A1* | 3/2023 | Park | H04W 72/232 |
| 2023/0155776 A1* | 5/2023 | Abdelghaffar | H04W 72/23 370/329 |
| 2023/0300832 A1* | 9/2023 | Zhang | H04L 5/0053 370/329 |
| 2023/0362951 A1* | 11/2023 | Zhu | H04L 5/0051 |
| 2023/0397226 A1* | 12/2023 | Matsumura | H04W 72/1268 |
| 2024/0032088 A1* | 1/2024 | Park | H04B 7/0456 |
| 2024/0048305 A1* | 2/2024 | Khoshnevisan | H04B 7/0404 |
| 2024/0049193 A1* | 2/2024 | Abdelghaffar | H04W 76/20 |
| 2024/0114504 A1* | 4/2024 | Gao | H04W 72/1268 |
| 2024/0178976 A1* | 5/2024 | Wang | H04L 5/0048 |
| 2024/0214158 A1* | 6/2024 | Wang | H04W 72/232 |
| 2024/0224292 A1* | 7/2024 | Li | H04L 5/001 |

FOREIGN PATENT DOCUMENTS

| | | | | | |
|---|---|---|---|---|---|
| BR | 112020020178 A2 | * | 1/2021 | | H04W 72/23 |
| CN | 111919478 A | * | 11/2020 | | H04W 72/23 |
| CN | 111919478 B | * | 7/2023 | | H04W 48/12 |
| CN | 118474887 A | * | 8/2024 | | H04L 1/1812 |
| EP | 3202073 B1 | * | 2/2019 | | H04W 72/23 |
| EP | 4113854 A1 | * | 1/2023 | | H04B 7/024 |
| EP | 3777375 B1 | * | 9/2023 | | H04W 48/12 |
| JP | 2021520706 A | * | 8/2021 | | H04W 72/23 |
| JP | 7370999 B2 | * | 10/2023 | | H04W 48/12 |
| KR | 20200139176 A | * | 12/2020 | | H04W 72/23 |
| KR | 20240019158 A | * | 2/2024 | | H04W 72/232 |
| TW | I794409 B | * | 3/2023 | | H04W 68/02 |
| WO | WO-2016053450 A1 | * | 4/2016 | | H04W 72/23 |
| WO | WO-2019194897 A1 | * | 10/2019 | | H04W 4/90 |
| WO | WO-2021221476 A1 | * | 11/2021 | | H04B 7/024 |
| WO | 2022085155 A1 | | 4/2022 | | |
| WO | 2024031513 A1 | | 2/2024 | | |
| WO | WO-2024038590 A1 | * | 2/2024 | | |
| WO | WO-2024038591 A1 | * | 2/2024 | | |

OTHER PUBLICATIONS

Qualcomm Incorporated, Simultaneous multi-panel transmission, May 9, 2022, 3GPP TSG RAN WG1 #109-e, Agenda Item: 9.1.4.1, Tdoc: R1-2205019 (Year: 2022).*

International Search Report and Written Opinion—PCT/US2023/074215—ISA/EPO—Jan. 16, 2024.

* cited by examiner

Figure 5:
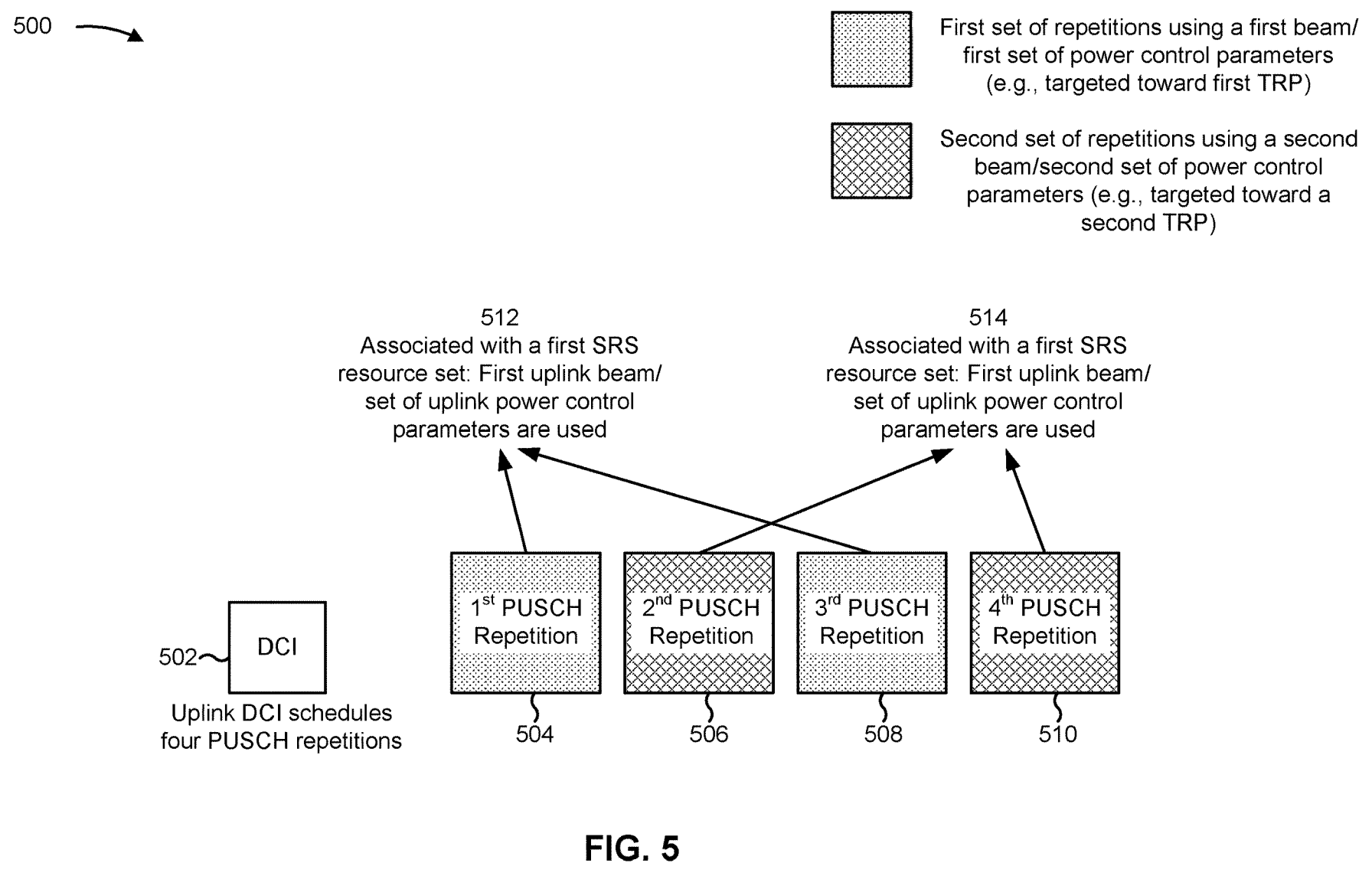

First set of repetitions using a first beam/ first set of power control parameters (e.g., targeted toward first TRP)

Second set of repetitions using a second beam/second set of power control parameters (e.g., targeted toward a second TRP)

514
Associated with a first SRS resource set: First uplink beam/ set of uplink power control parameters are used 512
Associated with a first SRS resource set: First uplink beam/ set of uplink power control parameters are used 510
4th PUSCH Repetition 508
3rd PUSCH Repetition 506
2nd PUSCH Repetition 504
1st PUSCH Repetition

502
DCI

Uplink DCI schedules four PUSCH repetitions

| Codepoint | SRS resource set(s) | SRI (for both CB and NCB)/TPMI (CB only) fields |
|---|---|---|
| 00 | sTRP mode with 1st SRS resource set (TRP1) | 1st SRI/TPMI field (2nd field is unused) |
| 01 | sTRP mode with 2nd SRS resource set (TRP2) | 1st SRI/TPMI field (2nd field is unused) |
| 10 | mTRP mode with (TRP1, TRP2 order)<br>1st SRI/TPMI field: 1st SRS resource set<br>2nd SRI/TPMI field: 2nd SRS resource set | Both 1st and 2nd SRI/TPMI fields |
| 11 | mTRP mode with (TRP2, TRP1 order)<br>1st SRI/TPMI field: 1st SRS resource set<br>2nd SRI/TPMI field: 2nd SRS resource set | Both 1st and 2nd SRI/TPMI fields |

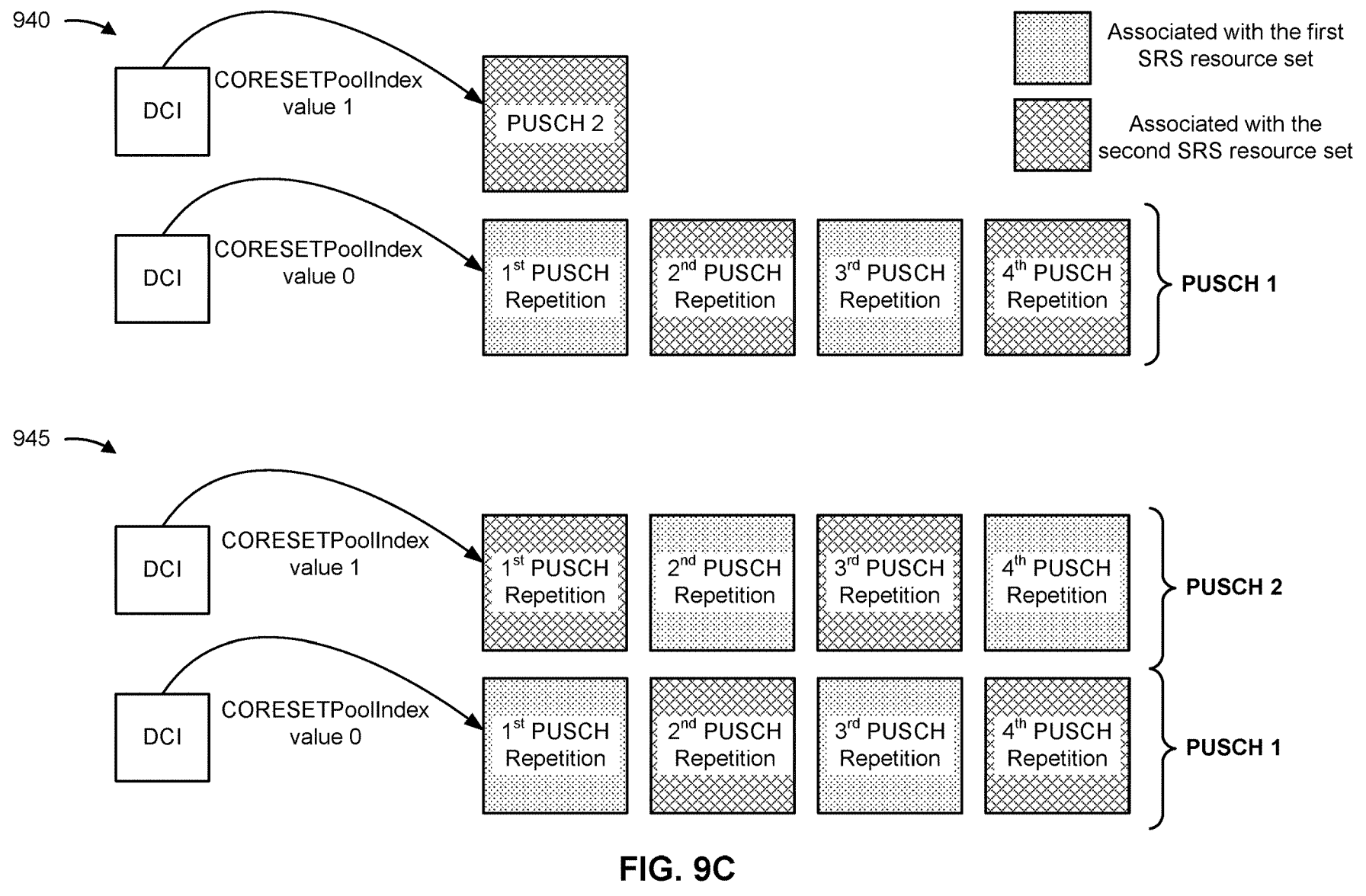

Associated with the first SRS resource set

Associated with the second SRS resource set

940

DCI → CORESETPoolIndex value 1 → PUSCH 2

DCI → CORESETPoolIndex value 0 → PUSCH 1 (1st PUSCH Repetition, 2nd PUSCH Repetition, 3rd PUSCH Repetition, 4th PUSCH Repetition)

945

DCI → CORESETPoolIndex value 1 → PUSCH 2 (1st PUSCH Repetition, 2nd PUSCH Repetition, 3rd PUSCH Repetition, 4th PUSCH Repetition)

DCI → CORESETPoolIndex value 0 → PUSCH 1 (1st PUSCH Repetition, 2nd PUSCH Repetition, 3rd PUSCH Repetition, 4th PUSCH Repetition)

FIG. 9C

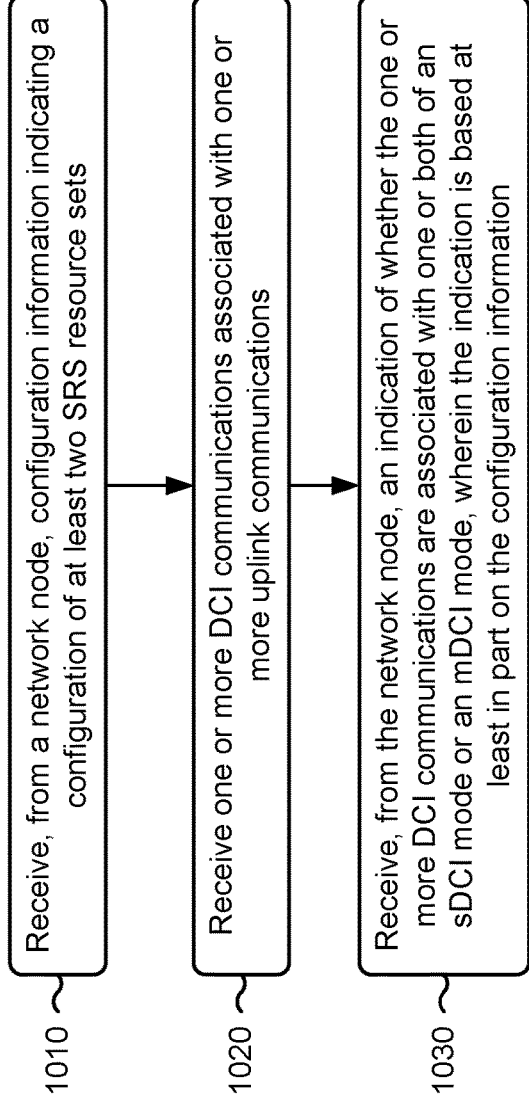

1010 — Receive, from a network node, configuration information indicating a configuration of at least two SRS resource sets 1020 — Receive one or more DCI communications associated with one or more uplink communications 1030 — Receive, from the network node, an indication of whether the one or more DCI communications are associated with one or both of an sDCI mode or an mDCI mode, wherein the indication is based at least in part on the configuration information

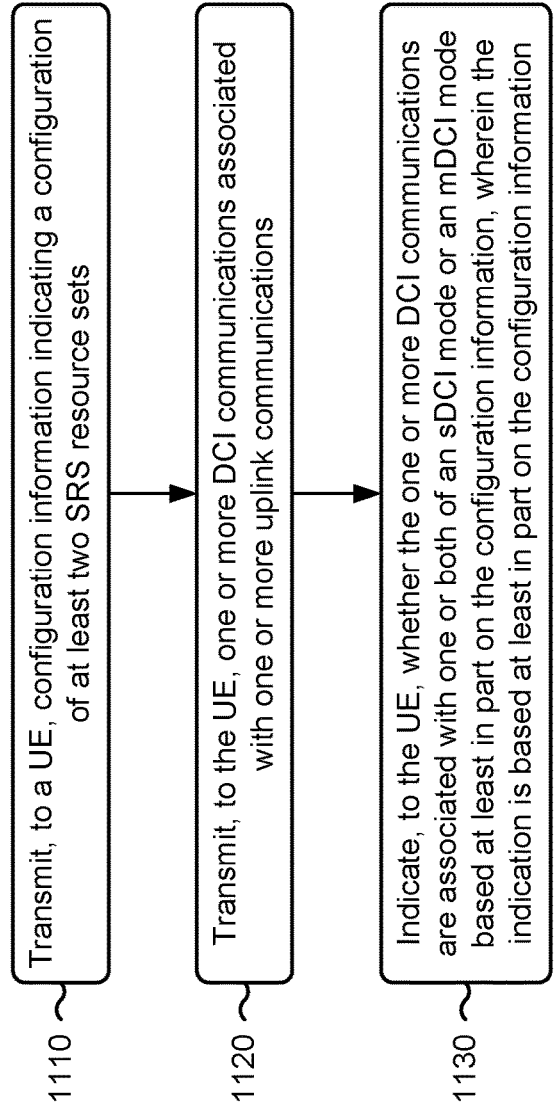

1110 — Transmit, to a UE, configuration information indicating a configuration of at least two SRS resource sets 1120 — Transmit, to the UE, one or more DCI communications associated with one or more uplink communications 1130 — Indicate, to the UE, whether the one or more DCI communications are associated with one or both of an sDCI mode or an mDCI mode based at least in part on the configuration information, wherein the indication is based at least in part on the configuration information

DOWNLINK CONTROL INFORMATION (DCI) FOR SINGLE DCI AND MULTIPLE DCI TRANSMISSION MODES

FIELD OF THE DISCLOSURE

Aspects of the present disclosure generally relate to wireless communication and to techniques and apparatuses for downlink control information (DCI) for single DCI and multiple DCI transmission modes.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network node, configuration information indicating a configuration of at least two sounding reference signal (SRS) resource sets. The method may include receiving one or more downlink control information (DCI) communications associated with one or more uplink communications. The method may include receiving, from the network node, an indication of whether the one or more DCI communications are associated with one or both of a single DCI (sDCI) mode or a multiple DCI (mDCI) mode, wherein the indication is based at least in part on the configuration information.

Some aspects described herein relate to a method of wireless communication performed by network node. The method may include transmitting, to a UE, configuration information indicating a configuration of at least two SRS resource sets. The method may include transmitting, to the UE, one or more DCI communications associated with one or more uplink communications. The method may include indicating, to the UE, whether the one or more DCI communications are associated with one or both of an sDCI mode or an mDCI mode based at least in part on the configuration information, wherein the indication is based at least in part on the configuration information.

Some aspects described herein relate to a UE for wireless communication. The user equipment may include a memory and one or more processors coupled to the memory. The one or more processors may be configured to receive, from a network node, configuration information indicating a configuration of at least two SRS resource sets. The one or more processors may be configured to receive one or more DCI communications associated with one or more uplink communications. The one or more processors may be configured to receive, from the network node, an indication of whether the one or more DCI communications are associated with one or both of an sDCI mode or an mDCI mode, wherein the indication is based at least in part on the configuration information.

Some aspects described herein relate to a network node for wireless communication. The network node may include a memory and one or more processors coupled to the memory. The one or more processors may be configured to transmit, to a UE, configuration information indicating a configuration of at least two SRS resource sets. The one or more processors may be configured to transmit, to the UE, one or more DCI communications associated with one or more uplink communications. The one or more processors may be configured to indicate, to the UE, whether the one or more DCI communications are associated with one or both of an sDCI mode or an mDCI mode based at least in part on the configuration information, wherein the indication is based at least in part on the configuration information.

Some aspects described herein relate to a non-transitory computer-readable medium that stores a set of instructions for wireless communication by a UE. The set of instructions, when executed by one or more processors of the UE, may cause the UE to receive, from a network node, configuration information indicating a configuration of at least two SRS resource sets. The set of instructions, when executed by one or more processors of the UE, may cause the UE to receive one or more DCI communications associated with one or more uplink communications. The set of instructions, when executed by one or more processors of the UE, may cause the UE to receive, from the network node, an indication of whether the one or more DCI communications are associated with one or both of an sDCI mode or an mDCI mode, wherein the indication is based at least in part on the configuration information.

Some aspects described herein relate to a non-transitory computer-readable medium that stores a set of instructions for wireless communication by a network node. The set of instructions, when executed by one or more processors of the network node, may cause the network node to transmit, to a UE, configuration information indicating a configuration of at least two SRS resource sets. The set of instructions, when executed by one or more processors of the network node, may cause the network node to transmit, to the UE, one or more DCI communications associated with one or more uplink communications. The set of instructions, when executed by one or more processors of the network node, may cause the network node to indicate, to the UE, whether the one or more DCI communications are associated with one or both of an sDCI mode or an mDCI mode based at least in part on the configuration information, wherein the indication is based at least in part on the configuration information.

Some aspects described herein relate to an apparatus for wireless communication. The apparatus may include means for receiving, from a network node, configuration information indicating a configuration of at least two SRS resource sets. The apparatus may include means for receiving one or more DCI communications associated with one or more uplink communications. The apparatus may include means for receiving, from the network node, an indication of whether the one or more DCI communications are associated with one or both of an sDCI mode or an mDCI mode, wherein the indication is based at least in part on the configuration information.

Some aspects described herein relate to an apparatus for wireless communication. The apparatus may include means for transmitting, to a UE, configuration information indicating a configuration of at least two SRS resource sets. The apparatus may include means for transmitting, to the UE, one or more DCI communications associated with one or more uplink communications. The apparatus may include means for indicating, to the UE, whether the one or more DCI communications are associated with one or both of an sDCI mode or an mDCI mode based at least in part on the configuration information, wherein the indication is based at least in part on the configuration information.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example associated with a single downlink control information (DCI) based time division multiplex physical uplink shared channel (PUSCH) transmission, in accordance with the present disclosure.

FIGS. 6A-6B are diagrams illustrating an example associated with an SRS resource set indicator field, in accordance with the present disclosure.

FIGS. 9A-9D are diagrams of an example associated with DCI for single DCI and multiple DCI transmission modes, in accordance with the present disclosure.

FIG. 10 is a diagram illustrating an example process performed, for example, by a UE, in accordance with the present disclosure.

FIG. 11 is a diagram illustrating an example process performed, for example, by a network node, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
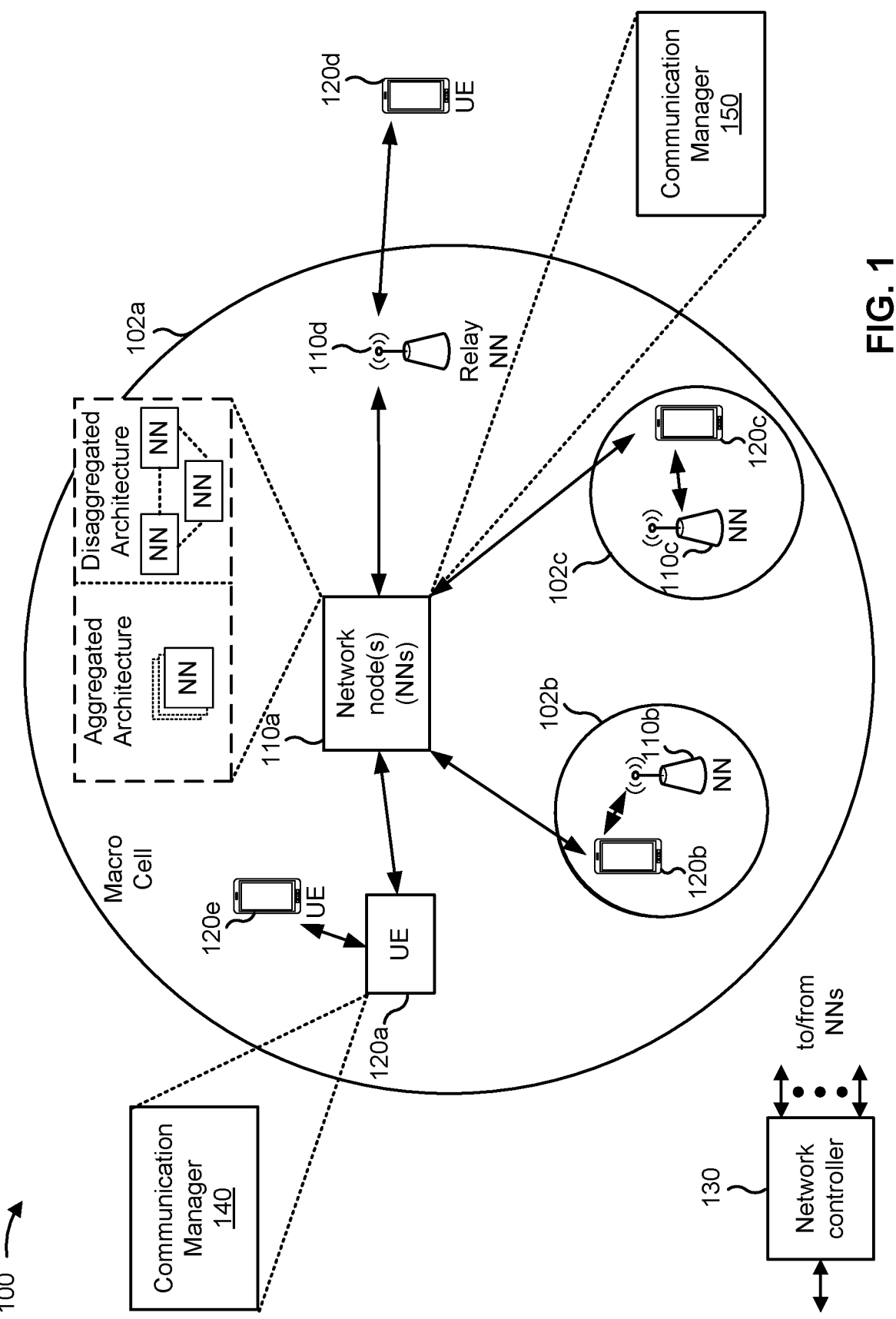
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node, configuration information indicating a configuration of at least two sounding reference signal (SRS) resource sets; receive one or more downlink control information (DCI) communications associated with one or more uplink communications; and receive, from the network node, an indication of whether the one or more DCI communications are associated with one or both of a single DCI (sDCI) mode or a multiple DCI (mDCI) mode, wherein the indication is based at least in part on the configuration information. Additionally, or alternatively, the communication manager 140 may perform one or more other operations described herein.

In some aspects, the network node 110 may include a communication manager 150. As described in more detail elsewhere herein, the communication manager 150 may transmit, to a UE, configuration information indicating a configuration of at least two SRS resource sets; transmit, to the UE, one or more DCI communications associated with one or more uplink communications; and indicate, to the UE, whether the one or more DCI communications are associated with one or both of an sDCI mode or an mDCI mode based at least in part on the configuration information, wherein the indication is based at least in part on configuration information. Additionally, or alternatively, the communication manager 150 may perform one or more other operations described herein.

As indicated above, FIG. 1 is provided as an example. Other examples may differ from what is described with regard to FIG. 1.

Figure 2:
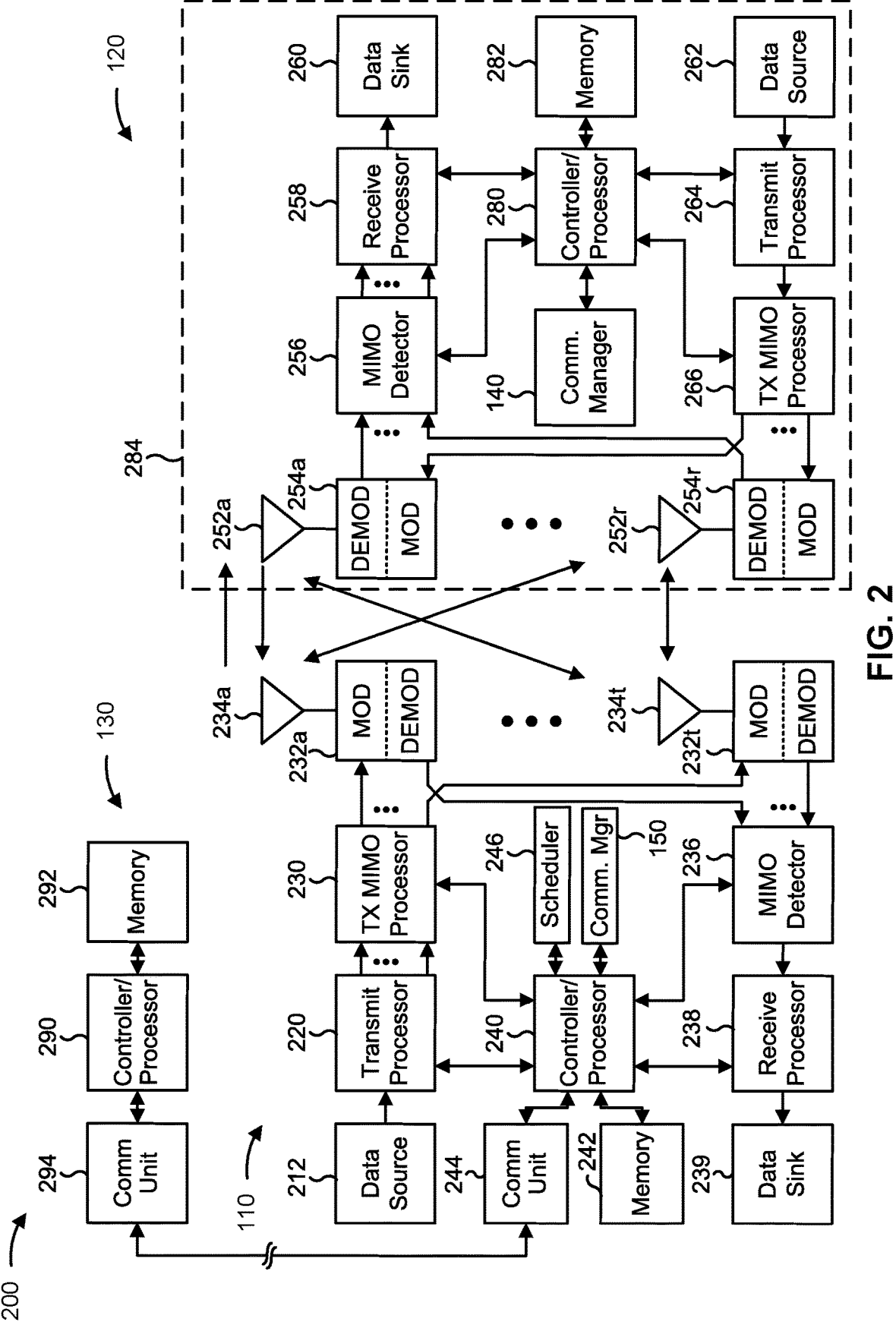
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 9A-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller

130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 9A-13).

The controller/processor 240 of the network node 110, the controller/processor 280 of the UE 120, and/or any other component(s) of FIG. 2 may perform one or more techniques associated with DCI for single DCI and multiple DCI transmission modes, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE 120 includes means for receiving, from a network node, configuration information indicating a configuration of at least two SRS resource sets; means for receiving one or more DCI communications associated with one or more uplink communications; and/or means for receiving, from the network node, an indication of whether the one or more DCI communications are associated with one or both of an sDCI mode or an mDCI mode, wherein the indication is based at least in part on the configuration information. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, to a UE, configuration information indicating a configuration of at least two SRS resource sets; means for transmitting, to the UE, one or more DCI communications associated with one or more uplink communications; and/or means for indicating, to the UE, whether the one or more DCI communications are associated with one or both of an sDCI mode or an mDCI mode based at least in part on the configuration information, wherein the indication is based at least in part on the configuration information. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
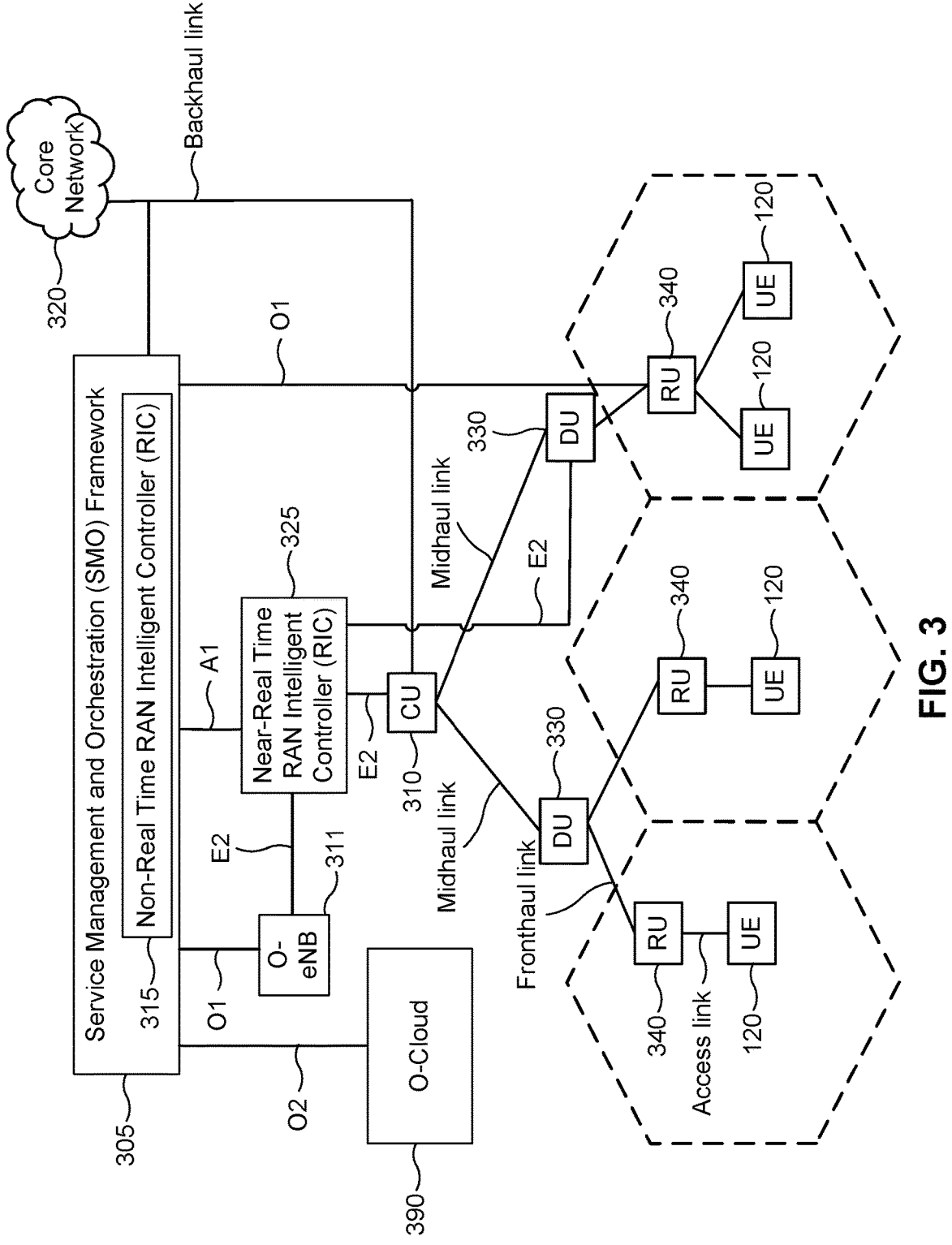
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT MC 325 and may be received at the SMO Framework 305 or the Non-RT MC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
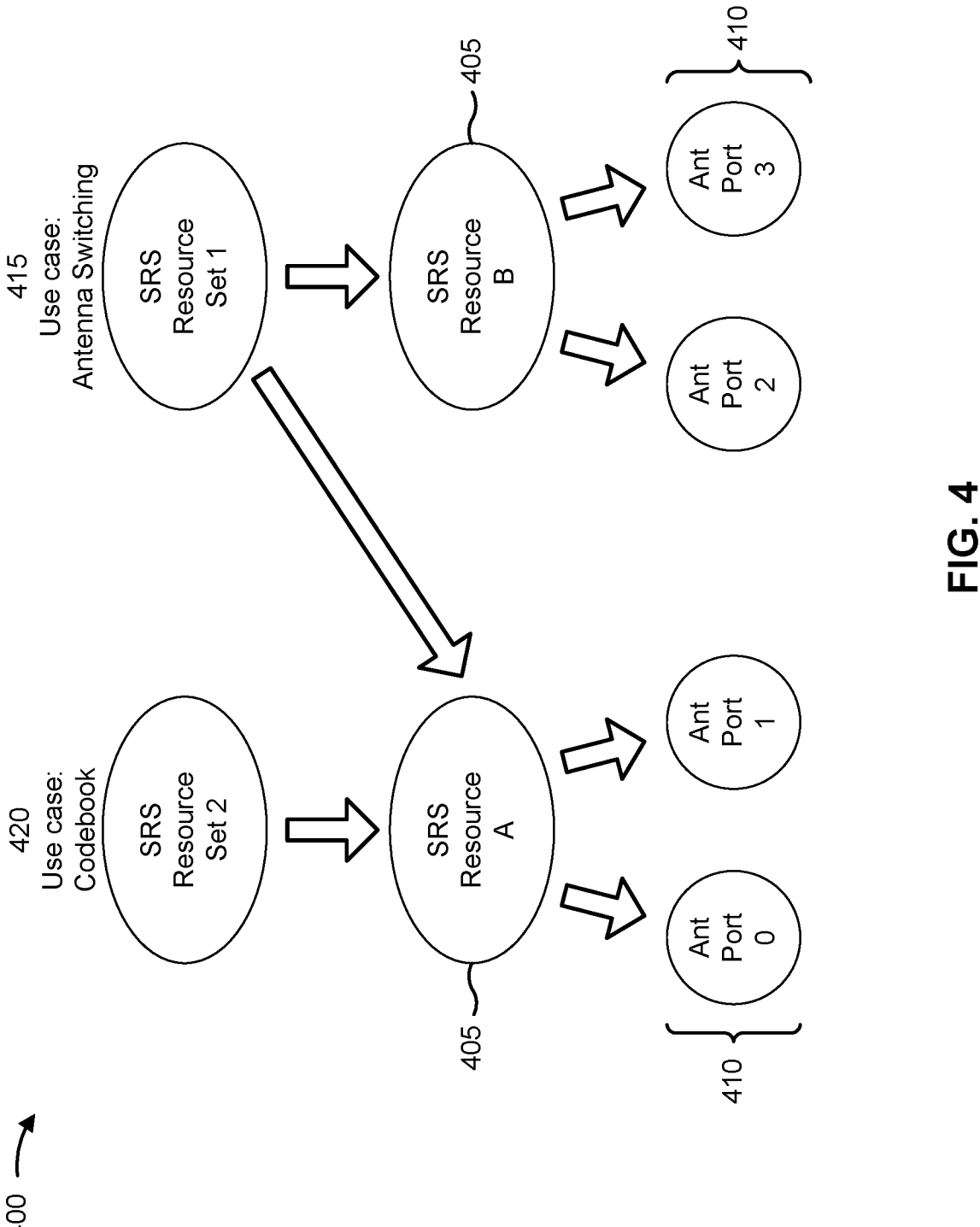
FIG. 4 is a diagram illustrating an example of sounding reference signal (SRS) resource sets, in accordance with the present disclosure.

FIG. 4 is a diagram illustrating an example 400 of SRS resource sets, in accordance with the present disclosure.

A UE 120 may be configured with one or more SRS resource sets to allocate resources for SRS transmissions by the UE 120. For example, a configuration for SRS resource sets may be indicated in a RRC message (e.g., an RRC configuration message or an RRC reconfiguration message). As shown by reference number 405, an SRS resource set may include one or more resources (e.g., shown as SRS resources), which may include time resources and/or frequency resources (e.g., a slot, a symbol, a resource block, and/or a periodicity for the time resources).

As shown by reference number 410, an SRS resource may include one or more antenna ports on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case (e.g., in an SRS-SetUse information element) for the SRS resource set. For example, an SRS resource set may have a use case of antenna switching, codebook, non-codebook, or beam management.

An antenna switching SRS resource set may be used to indicate downlink CSI with reciprocity between an uplink and downlink channel. For example, when there is reciprocity between an uplink channel and a downlink channel, a network node 110 may use an antenna switching SRS (e.g., an SRS transmitted using a resource of an antenna switching SRS resource set) to acquire downlink CSI (e.g., to determine a downlink precoder to be used to communicate with the UE 120).

A codebook SRS resource set may be used to indicate uplink CSI when a network node 110 indicates an uplink precoder to the UE 120. For example, when the network node 110 is configured to indicate an uplink precoder to the UE 120 (e.g., using a precoder codebook), the network node 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the network node 110). In some aspects, virtual ports (e.g., a combination of two or more antenna ports) with a maximum transmit power may be supported at least for a codebook SRS.

A non-codebook SRS resource set may be used to indicate uplink CSI when the UE 120 selects an uplink precoder (e.g., instead of the network node 110 indicated an uplink precoder to be used by the UE 120). For example, when the UE 120 is configured to select an uplink precoder, the network node 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the network node 110).

A beam management SRS resource set may be used for indicating CSI for millimeter wave communications.

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and may be dynamically activated and deactivated (e.g., using DCI or a MAC control element (MAC-CE)). An aperiodic SRS resource may be triggered dynamically, such as via DCI (e.g., UE-specific DCI or group common DCI) or a MAC-CE.

In some aspects, the UE 120 may be configured with a mapping between SRS ports (e.g., antenna ports) and corresponding SRS resources. The UE 120 may transmit an SRS on a particular SRS resource using an SRS port indicated in the configuration. In some aspects, an SRS resource may span N adjacent symbols within a slot (e.g., where N equals 1, 2, or 4). The UE 120 may be configured with X SRS ports (e.g., where X≤4). In some aspects, each of the X SRS ports may mapped to a corresponding symbol of the SRS resource and used for transmission of an SRS in that symbol.

As shown in FIG. 4, in some aspects, different SRS resource sets indicated to the UE 120 (e.g., having different use cases) may overlap (e.g., in time and/or in frequency, such as in the same slot). For example, as shown by reference number 415, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

As shown by reference number 420, a second SRS resource set (e.g., shown as SRS Resource Set 2) may be a codebook use case. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, the UE 120 may not transmit codebook SRSs in SRS Resource B (e.g., the second time-frequency resource) using antenna port 2 and antenna port 3.

In some examples, a UE 120 and/or a network node 110 may support codebook (CB) based physical uplink shared channel (PUSCH) transmissions and non-codebook (NCB) based PUSCH transmissions. For CB based PUSCH transmissions, a UE 120 may be configured with one SRS resource set with the use case (sometimes referred to as "usage") set to codebook. In such examples, a maximum of four SRS resources within the SRS resource set may be configured for the UE 120. An SRS resource indicator field (SRI) of an uplink DCI (e.g., a DCI scheduling a PUSCH transmission) associated with a CB based PUSCH transmission may indicate one SRS resource. A "precoding information and number of layers" field of the uplink DCI may indicate number of layers (e.g., rank) and a transmitted precoding matrix indicator (TPMI) for the scheduled PUSCH transmission.

For NCB based transmissions, a UE 120 may be configured with one SRS resource set with the use case set to non-codebook. In such examples, a maximum of four SRS resources within the SRS resource set may be configured for the SRS 120, with each SRS resource having one port. The SRI of an uplink DCI associated with a NCB based SRS transmission may indicate one or multiples SRS resources, with the number of indicated SRS resources corresponding to the rank (e.g., number of layers) for the scheduled SRS. In such examples, a scheduled SRS transmission may be transmitted with the same precoder as the indicated SRS resources. Additional details of associating SRS resources and/or SRS resource sets with SRS transmissions are described in more detail below in connection with FIGS. 5-8.

As indicated above, FIG. 4 is provided as an example. Other examples may differ from what is described with regard to FIG. 4.

FIG. 5 is a diagram illustrating an example 500 associated with single DCI based time division multiplex (TDM) SRS transmission, in accordance with the present disclosure. In some aspects, the features shown and described in connection with FIG. 5 may be referred to an sDCI transmission mode or, more simply, an sDCI mode.

In some examples, an SRS 120 may be scheduled by a single DCI to transmit multiple SRS repetitions in a TDM manner. Each SRS repetition may be associated with the same transport block (TB) (e.g., each of the different repetitions may be used to transmit the same data packet), but each SRS repetition may correspond to different transmission parameters, such as a beam parameter, a spatial relation parameter, a transmission configuration indicator (TCI) state parameter, a power control parameter, a precoding parameter, or a similar parameter. In some cases, SRS repetitions scheduled by a single DCI may belong to two sets of SRS repetitions, with each set of SRS repetitions corresponding to a different set of transmission parameters (e.g., beam, spatial relation, TCI, power control, or precoding).

More particularly, FIG. 5 shows an example in which an uplink DCI 502 schedules four SRS repetitions, including a first SRS repetition 504, a second SRS repetition 506, a third SRS repetition 508, and a fourth SRS repetition 510. The SRS repetitions 504, 506, 508, 510 may be associated with two sets of transmission parameters, indicated using stippling and cross-hatching in FIG. 5. For example, as shown using stippling, the first SRS repetition 504 and the third SRS repetition 508 may be associated with a first set of repetitions using a first beam and/or a first set of power control parameters, among other parameters. In some cases, the SRS repetitions associated with the first set of SRS repetitions may be targeted toward a first network node 110 (e.g., a first TRP). As shown using cross-hatching, the second SRS repetition 506 and the fourth SRS repetition 510 may be associated with a second set of repetitions using a second beam and/or a second set of power control parameters, among other parameters. In some cases, the SRS repetitions associated with the second set of SRS repetitions may be targeted toward a second network node 110 (e.g., a second TRP) different from the first network node 110.

To enable the single DCI based TDM SRS transmissions shown in FIG. 5, the two sets of SRS repetitions may correspond to two SRS resource sets. More particularly, the uplink DCI 502 may indicate two beams, two power control parameters, or two of similar transmission parameters by using two corresponding SRI fields in the uplink DCI 502 for both CB based SRS transmissions and NCB based SRS transmissions. For CB based SRS transmissions, the uplink DCI 502 may also include two TPMI fields indicating two precoders for the two sets of SRS repetitions. In the example shown in FIG. 5, and as indicated by reference number 512, the first set of PUSCH repetitions (e.g., the first SRS repetition 504 and the third SRS repetition 508) may be associated with a first SRS resource set, which may be indicated by the first SRI field included in the uplink DCI 502. Similarly, and as indicated by reference number 514, the second set of SRS repetitions (e.g., the second SRS repetition 506 and the fourth SRS repetition 510) may be associated with a second SRS resource set, which may be indicated by the second SRI field included in the uplink DCI 502.

In some cases, an SRS 120 may be scheduled by a single DCI (e.g., uplink DCI 502) to transmit multiple SRS repetitions associated with spatial division multiplex (SDM) transmissions, frequency division multiplex (FDM) transmissions, or single frequency network (SFN) transmissions. In such cases, the DCI signaling associated with the multiple SRS repetitions associated with SDM transmissions, FDM transmissions, or SFN transmissions may be similar to the signaling described above in connection with the multiple SRS repetitions associated with TDM transmissions. For example, for multiple SRS repetitions associated with SDM transmissions, different sets of layers associated with SRS transmissions may be associated with different SRS resource sets. For multiple SRS repetitions associated with FDM transmissions, different sets of resource blocks (RBs) associated with the SRS transmissions may be associated with different SRS resource sets. And for multiple SRS repetitions associated with SFN transmissions, each layer and/or DMRS may be associated with both SRS resource sets.

Although the example shown and described in connection with FIG. 5 includes SRS repetitions associated with two network nodes and/or TRPs (e.g., associated with two SRS resource sets), in some other examples an uplink DCI may schedule SRS repetitions associated with a single network node and/or TRP (e.g., associated with one SRS resource set). Examples of dynamic switching between a multi-network-node and/or a multi-TRP scenario and a single-network-node and/or a single-TRP scenario are described in more detail below in connection with FIGS. 6A and 6B.

As indicated above, FIG. 5 is provided as an example. Other examples may differ from what is described with respect to FIG. 5.

Figure 6A:
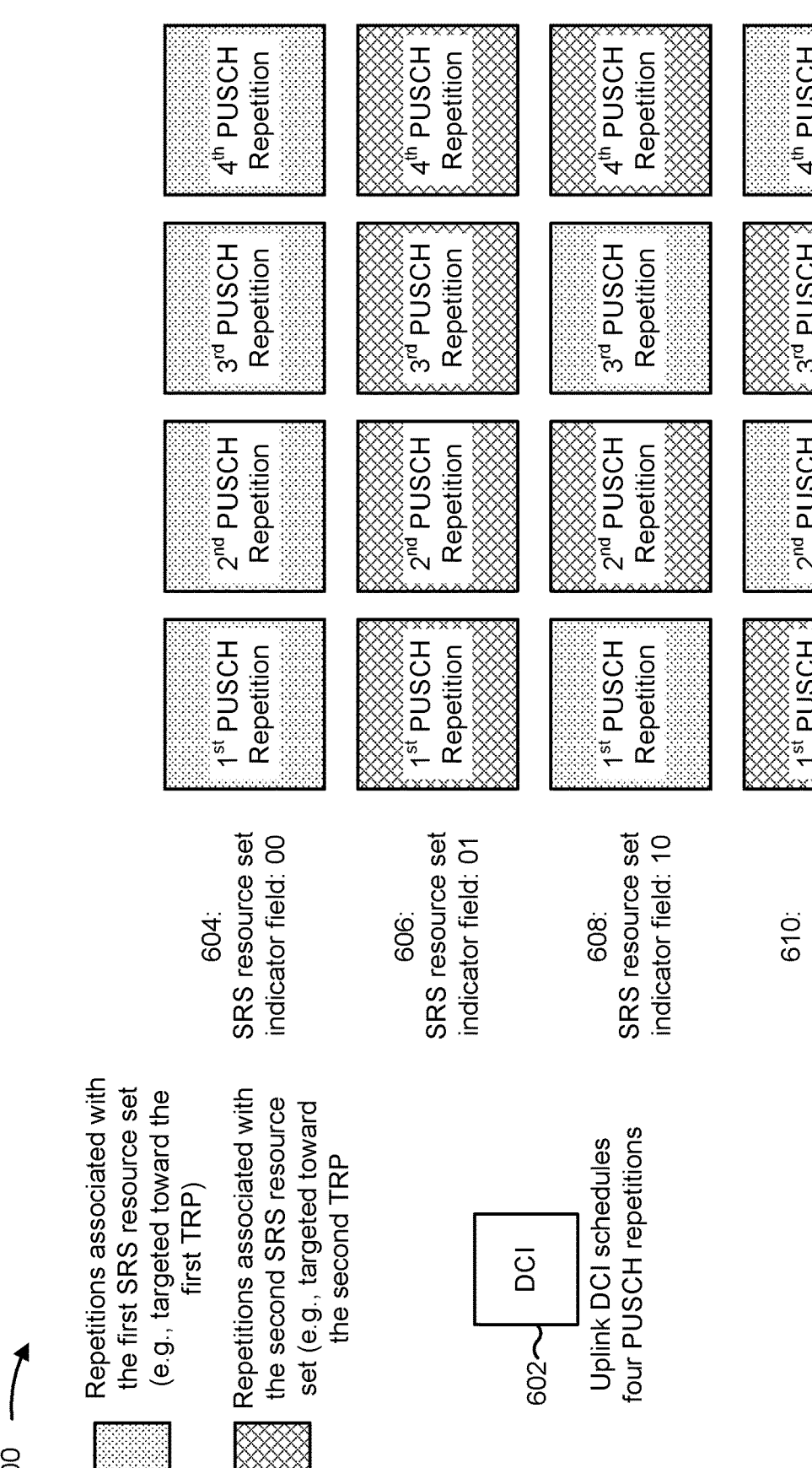

FIGS. 6A-6B are diagrams illustrating an example 600 associated with an SRS resource set indicator field, in accordance with the present disclosure.

In some examples, an uplink DCI may include an SRS resource set indicator field, indicating whether SRS repetitions are associated with a single network node and/or TRP (sometimes referred to as a single TRP (sTRP) mode) or with multiple network nodes and/or TRPs (sometimes referred to as a multiple TRP (mTRP) mode). More particularly, the SRS resource set indicator field may be a field included in an uplink DCI (e.g., a DCI format 0_1 communication or a DCI format 0_2 communication), and the presence of the field in the uplink DCI may be based on whether two SRS resource sets are configured corresponding to the DCI format. Additionally, a presence of a second SRI field and/or second TPMI field (e.g., for CB based transmissions) may conditioned on the presence of the SRS resource set indicator field.

More particularly, as shown in FIG. 6A, an uplink DCI 602 may schedule four SRS repetitions, in a similar manner as described above in connection with uplink DCI 502. In this example, the four SRS repetitions may be associated with one of four repetition patterns, indicated by reference numbers 604, 606, 608, and 610. In the first example, indicated by reference number 604, each SRS repetition is associated with the same SRS resource set (e.g., the first SRS resource set), and thus all SRS repetitions may be targeted toward the same network node and/or TRP (e.g., the example shown by reference number 604 may correspond to an sTRP mode). In such examples, the SRS resource set indicator field may indicate a codepoint of "00." Similarly, in the second example, indicated by reference number 606, each SRS repetition is associated with the same SRS resource set, but in this example the SRS resource set is the second SRS resource set. Thus, all SRS repetitions in the example depicted by reference number 606 may be targeted toward the same network node and/or TRP (e.g., an sTRP mode), which may be a different network node and/or TRP than is associated with the first example indicated by reference number 604. In such examples, the SRS resource set indicator field may indicate a codepoint of "01."

In the third example, indicated by reference number 608, two of the SRS repetitions (e.g., the first and the third SRS repetitions) are associated with the first SRS resource set (e.g., targeted toward a first network node and/or TRP), and the other two SRS repetitions (e.g., the second and the fourth SRS repetitions) are associated with the second SRS resource set (e.g., targeted toward a second network node and/or TRP). In that regard, the third example may be associated with an mTRP mode and may be substantially similar to the example described above in connection with FIG. 5. In such examples, the SRS resource set indicator field may indicate a codepoint of "10." The fourth example, indicated by reference number 610, may be similar to the third example but with the SRS repetitions in a different order. More particularly, in this example the first and the third SRS repetitions are associated with the second SRS resource set (e.g., targeted toward the second network node and/or TRP), and the other two SRS repetitions (e.g., the second and the fourth SRS repetitions) are associated with a first SRS resource set (e.g., targeted toward the first network node and/or TRP). In such examples, the SRS resource set indicator field may indicate a codepoint of "11."

In this way, a network node 110 may dynamically switch between sTRP modes and mTRP modes by indicating a corresponding codepoint (e.g., one of 00, 01, 10, or 11) in the SRS resource set indicator field of an uplink DCI. Moreover, as shown by the table indicated by reference number 612 in FIG. 6B, the codepoint indicated by the SRS resource set indicator field may indicate which SRS resource sets are to be used, and/or which SRI and/or TPMI fields are used in the uplink DCI 602. More particularly, as described above in connection with the first example indicated by reference number 604, a codepoint of 00 may indicate an sTRP mode associated with the first SRS resource set (e.g., all SRS repetitions are associated with the first SRS resource set and/or targeted toward the same network node and/or TRP, shown as TRP1 in FIG. 6B). In such examples, only a first SRI field (for both CB and NCB based transmissions) and/or a first TPMI field (for CB based transmissions) may be used in the uplink DCI 602 (e.g., a second SRI field and a first TPMI field in the uplink DCI 602 may be unused in this example). As described above in connection with the second example indicated by reference number 606, a codepoint of 01 may indicate an sTRP mode associated with the second SRS resource set (e.g., all PUSCH repetitions are associated with the second SRS resource set and/or targeted toward the same network node and/or TRP, shown as TRP2 in FIG. 6B). In such examples, only the first SRI field and/or the first TPMI field may be used in the uplink DCI 602 (e.g., the second SRI field and the first TPMI field in the uplink DCI 602 may be unused in this example).

As described above in connection with the third example indicated by reference number 608, a codepoint of 10 may indicate an mTRP mode associated with a transmission order of TRP1, TRP2 (e.g., the first and third PUSCH repetitions are associated with the first SRS resource set and/or targeted toward TRP1, and the second and fourth PUSCH repetitions are associated with the second SRS resource set and/or targeted toward TRP2). In such examples, both the first SRI field and/or the first TPMI field and the second SRS field and/or the second TPMI field may be used in the uplink DCI 602. Similarly, as described above in connection with the fourth example indicated by reference number 610, a codepoint of 11 may indicate an mTRP mode associated with a transmission order of TRP2, TRP1 (e.g., the first and third PUSCH repetitions are associated with the second SRS resource set and/or targeted toward TRP2, and the second and fourth PUSCH repetitions are associated with the first SRS resource set and/or targeted toward TRP1). In such examples, both the first SRI field and/or the first TPMI and the second SRS field and/or the second TPMI field may be used in the uplink DCI 602.

Although FIGS. 5-6B show a single DCI based TDM PUSCH transmission (e.g., an sDCI mode), in some other aspects a UE 120 may receive multiple DCI communications scheduling corresponding PUSCH communications, which is described in more detail below in connection with FIG. 7.

As indicated above, FIGS. 6A-6B are provided as an example. Other examples may differ from what is described with respect to FIGS. 6A-6B.

Figure 7:
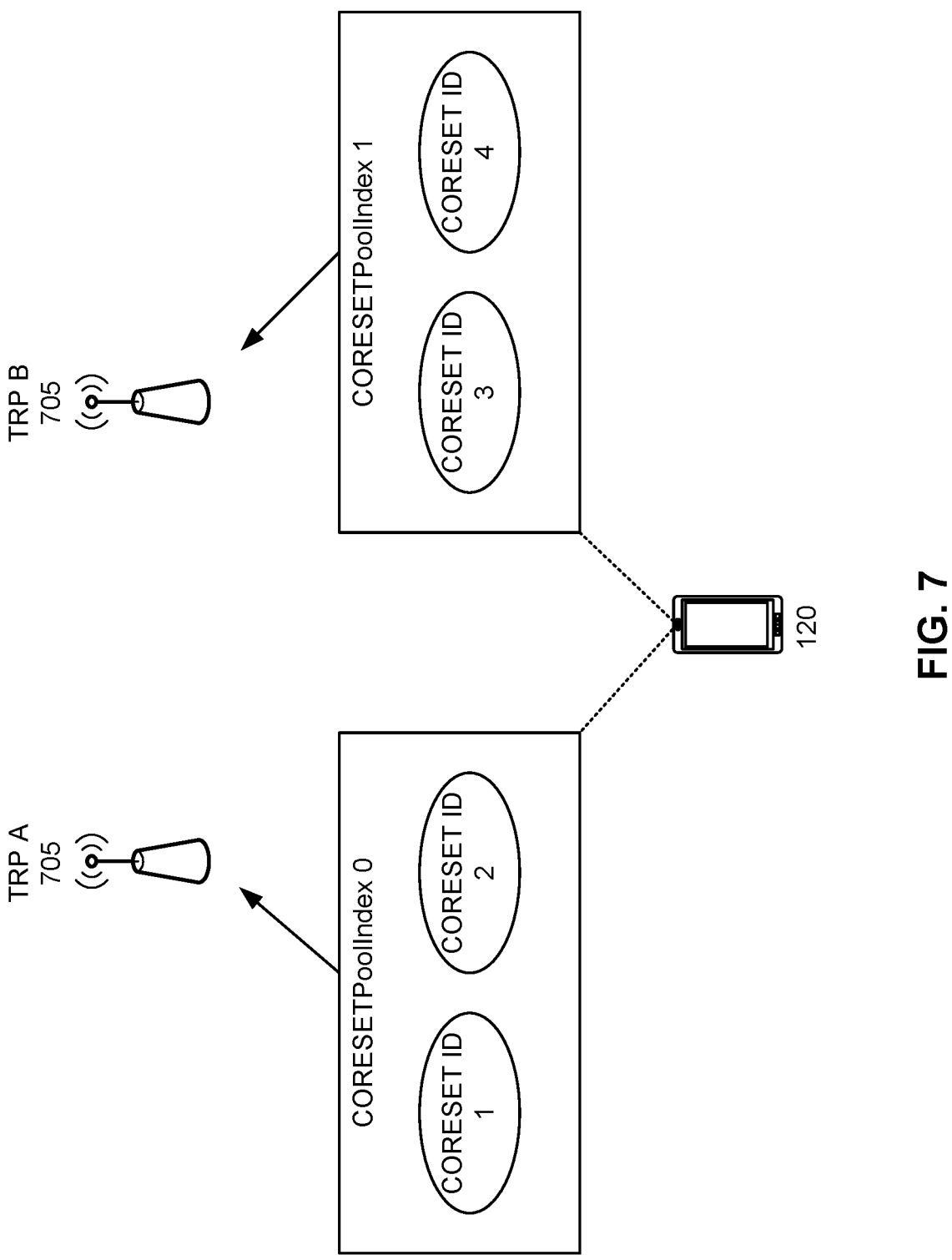
FIG. 7 is a diagram illustrating an example of transmission reception point differentiation at a UE based at least in part on a control resource set pool index, in accordance with the present disclosure.

FIG. 7 is a diagram illustrating an example of TRP differentiation at a UE based at least in part on a CORESET pool index, in accordance with the present disclosure. In some aspects, a CORESET pool index (or CORESET-PoolIndex) value may be used by a UE (a UE 120) to identify a TRP associated with an uplink grant received on a physical downlink control channel (PDCCH). In some aspects, the features shown and described in connection with FIG. 7 may be referred to as a multi-DCI based multi-TRP communication mode, or, more simply, an mDCI mode.

A CORESET may refer to a control region that is structured to support an efficient use of resources, such as by flexible configuration or reconfiguration of resources for one or more PDCCHs associated with a UE 120. In some aspects, a CORESET may occupy the first symbol of an orthogonal frequency division multiplexing (OFDM) slot, the first two symbols of an OFDM slot, or the first three symbols of an OFDM slot. Thus, a CORESET may include multiple RBs in the frequency domain, and either one, two, or three symbols in the time domain. In 5G, a quantity of resources included in a CORESET may be flexibly configured, such as by using RRC signaling to indicate a frequency domain region (for example, a quantity of resource blocks) or a time domain region (for example, a quantity of symbols) for the CORESET.

As illustrated in FIG. 7, a UE 120 may be configured with multiple CORESETs in a given serving cell. Each CORESET configured for the UE 120 may be associated with a CORESET identifier (CORESET ID). For example, a first CORESET configured for the UE 120 may be associated with CORESET ID 1, a second CORESET configured for the UE 120 may be associated with CORESET ID 2, a third CORESET configured for the UE 120 may be associated with CORESET ID 3, and a fourth CORESET configured for the UE 120 may be associated with CORESET ID 4.

As further illustrated in FIG. 7, two or more (for example, up to five) CORESETs may be grouped into a CORESET pool. Each CORESET pool may be associated with a CORESET pool index. As an example, CORESET ID 1 and CORESET ID 2 may be grouped into CORESET pool index 0, and CORESET ID 3 and CORESET ID 4 may be grouped into CORESET pool index 1. In a multi-TRP configuration, each CORESET pool index value may be associated with a particular TRP 705. As an example, and as illustrated in FIG. 7, a first TRP 705 (TRP A, which may correspond to TRP1 described above in connection with FIG. 6B) (or a first network node 110) may be associated with CORESET pool index 0 and a second TRP 705 (TRP B, which may correspond to TRP2 described above in connection with FIG. 6B) (or a second network node 110) may be associated with CORESET pool index 1. The UE 120 may be configured by a higher layer parameter, such as PDCCH-Config, with information identifying an association between a TRP and a CORESET pool index value assigned to the TRP. Put another way, a UE 120 may determine that that it is configured to operate with multi-DCI based multi-TRP (e.g., configured to operate in the mDCI mode) based on whether the UE 120 is configured by the higher layer parameter PDCCH-Config that contains two different values of CORE-SETPoolIndex for the active bandwidth part (BWP) of a serving cell. Accordingly, the UE may identify the TRP that transmitted a DCI uplink grant by determining the CORE-SET ID of the CORESET in which the PDCCH carrying the DCI uplink grant was transmitted, determining the CORE-SET pool index value associated with the CORESET pool in which the CORESET ID is included, and identifying the TRP associated with the CORESET pool index value.

In some examples, PUSCH communications scheduled by the multiple DCIs (e.g., the DCIs received from the TRP A and the TRP B) may be TDMed, and thus only one SRS resource set (for both CB based PUSCH transmissions and NCB based PUSCH transmissions) is used. However, in some other examples, PUSCH communications scheduled by the multiple DCIs may at least partially overlap in the time domain and/or multiple SRS resource sets may be used, as is described in more detail below in connection with FIG. 8.

As indicated above, FIG. 7 is provided as an example. Other examples may differ from what is described with respect to FIG. 7.

Figure 8:
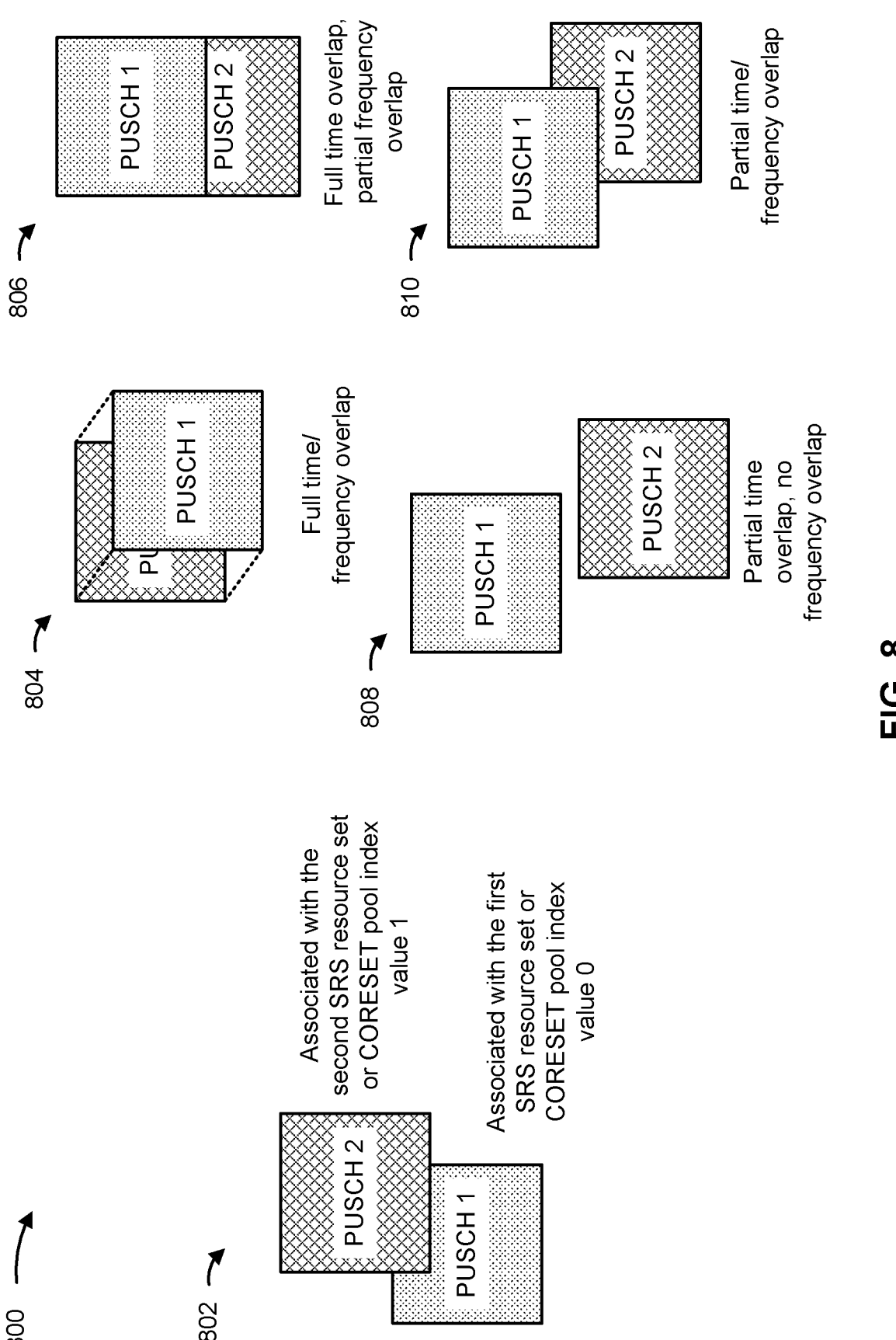
FIG. 8 is a diagram illustrating an example associated with time domain overlapping PUSCHs with multi-DCI, in accordance with the present disclosure.

FIG. 8 is a diagram illustrating an example 800 associated with time domain overlapping PUSCHs with multi-DCI, in accordance with the present disclosure.

As indicated by reference number 802, in some examples, two PUSCH transmissions, shown as PUSCH 1 and PUSCH 2, may be scheduled by two DCIs (e.g., PUSCH 1 and PUSCH 2 may be associated with the mDCI mode). In this example, the two PUSCH transmissions (e.g., PUSCH 1 and PUSCH 2) may be associated with the same serving cell and/or component carrier, and may at least partially overlap in the time domain. The first PUSCH transmission (e.g., PUSCH 1), which may be associated CORESET pool index value 0, may be associated with a first SRS resource set and/or a first set of transmission parameters (e.g., beam, TCI state, power control parameters, precoder, or similar parameters). The second PUSCH transmission (e.g., PUSCH 2), which may be associated CORESET pool index value 1, may be associated with a second SRS resource set and/or a second set of transmission parameters.

In such examples, the PUSCH transmissions may overlap in the frequency domain. More particularly, as shown in the example indicated by reference number 804, PUSCH 1 and PUSCH 2 may completely overlap in both the time domain and the frequency domain. Moreover, as shown in the example indicated by reference number 806, PUSCH 1 and PUSCH 2 may completely overlap in the time domain and may partially overlap in the frequency domain. As shown in the example indicated by reference number 808, PUSCH 1 and PUSCH 2 may partially overlap in the time domain and may have no overlap in the frequency domain. And as shown in the example indicated by reference number 810, PUSCH 1 and PUSCH 2 may partially overlap in both the time and frequency domains.

As described above, sDCI modes (e.g., the modes described above in connection with FIGS. 5-6B) and mDCI modes (e.g., the modes described above in connection with FIGS. 7-8) may share similarities and differences. More particularly, in both sDCI modes and mDCI modes, two SRS resource sets (e.g., with usage set to either codebook or non-codebook) may be configured for use by the UE 120. In sDCI modes, one PUSCH transmission scheduled by one uplink DCI may be associated with the two SRS resource sets, while in mDCI modes, two PUSCH transmissions scheduled by different uplink DCIs (which may be fully overlapping, partially overlapping, or non-overlapping in the time domain and/or frequency domain) are associated with the two SRS resource sets. Moreover, mDCI modes may be enabled based on configuration of two different CORESET pool index values, which is not the case for sDCI modes. Additionally, for sDCI modes, an uplink DCI includes an SRS resource set indicator, but the SRS resource set indicator is not needed for mDCI modes. Instead, in mDCI modes, an associated SRS resource set may be determined based on the CORESET pool index value of the CORESET in which the DCI is received (e.g., in mDCI modes, one DCI does not indicate two SRS resource sets). Moreover, in sDCI modes a second SRI field and a second TPMI filed are needed in the DCI, which are not needed for mDCI modes. In that regard, a presence of the SRS resource set indicator in a DCI (e.g., separately for DCI format 0_1 and DCI format 0_2) may be based on whether two resource sets are configured associated with the DCI format.

In some examples, a UE 120 receiving an uplink DCI may not be capable of determining whether the uplink DCI is associated with an sDCI mode or an mDCI mode. This may lead to communication errors and thus increased power, computing, and network resource consumption associated with retransmissions or otherwise associated with correcting communication errors. Moreover, a UE 120 may not have a capability to simultaneously operate in an sDCI mode and an mDCI mode. Accordingly, a UE 120 receiving DCIs associated with both modes may be unable to transmit PUSCH communications associated with each mode, leading to increased latency, reduced throughput, and overall inefficient usage of network resources.

Some techniques and apparatuses described herein enable a UE 120 to distinguish between an sDCI mode and an mDCI mode and/or to operate in a combination of sDCI and mDCI based operations. In some aspects, a UE 120 may distinguish between sDCI modes and mDCI modes based at least in part on an implicit or explicit indication received from a network node 110, such as based at least in part on configuration information associated with two SRS resource sets, an explicit configuration indication received from the network node, or similar information. Additionally or alternatively, in some aspects, a UE 120 and a network node 110 may dynamically switch between an sDCI mode and an mDCI mode, such as by using different DCI formats and/or DCI fields associated with each mode. Additionally, or alternatively, in some aspects, a UE 120 and a network node 110 may be capable of simultaneous transmissions using both an sDCI mode and an mDCI mode. As a result, communication errors between a UE 120 and a network node 110 may be reduced, resulting in decreased power, computing, and network resource consumption otherwise associated correcting communication errors, and a UE 120 and a network node 110 may communicate with decreased latency, increased throughput, and overall more efficient usage of network resources.

As indicated above, FIG. 8 is provided as an example. Other examples may differ from what is described with respect to FIG. 8.

Figure 9A:
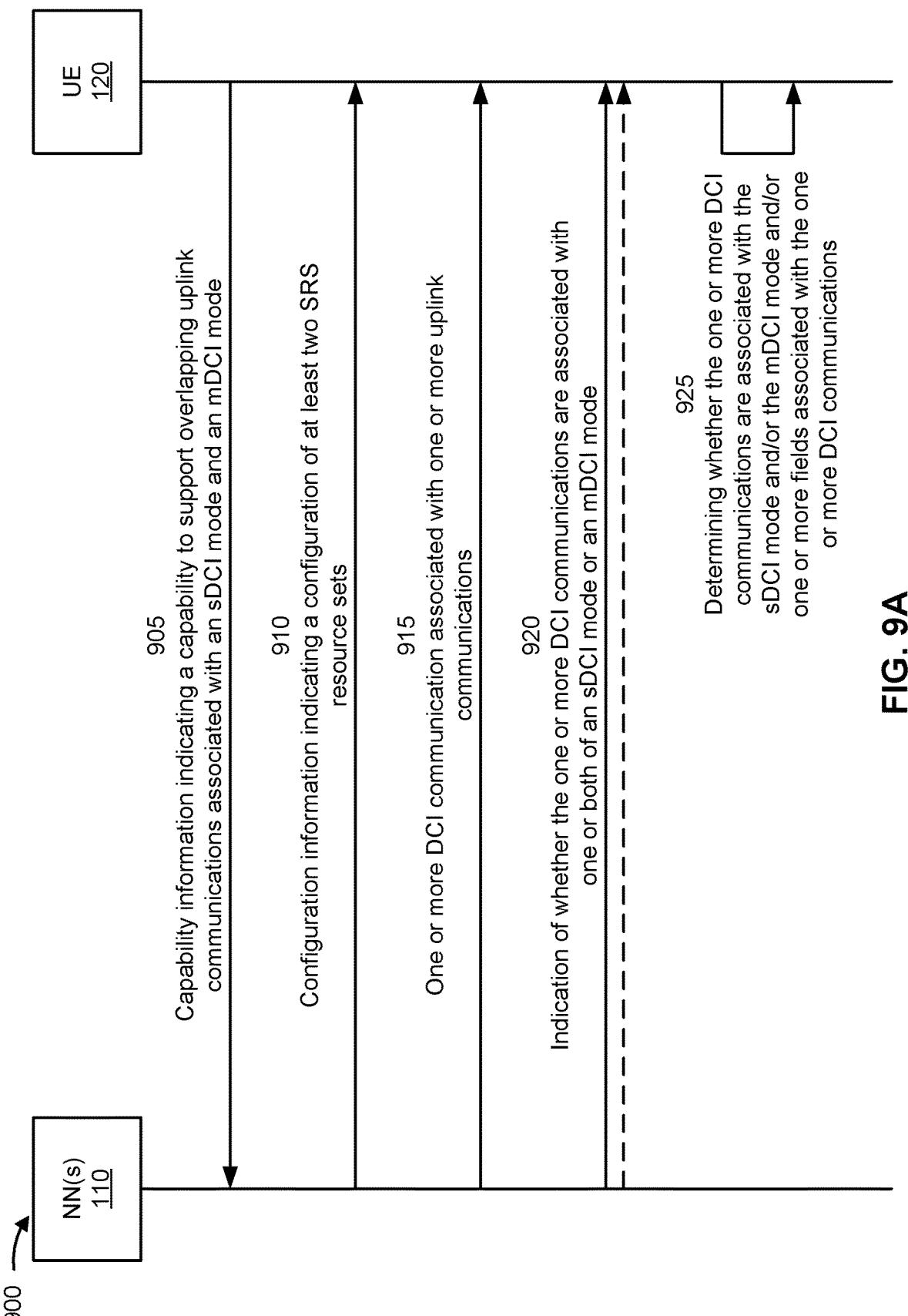
Figure 9B:
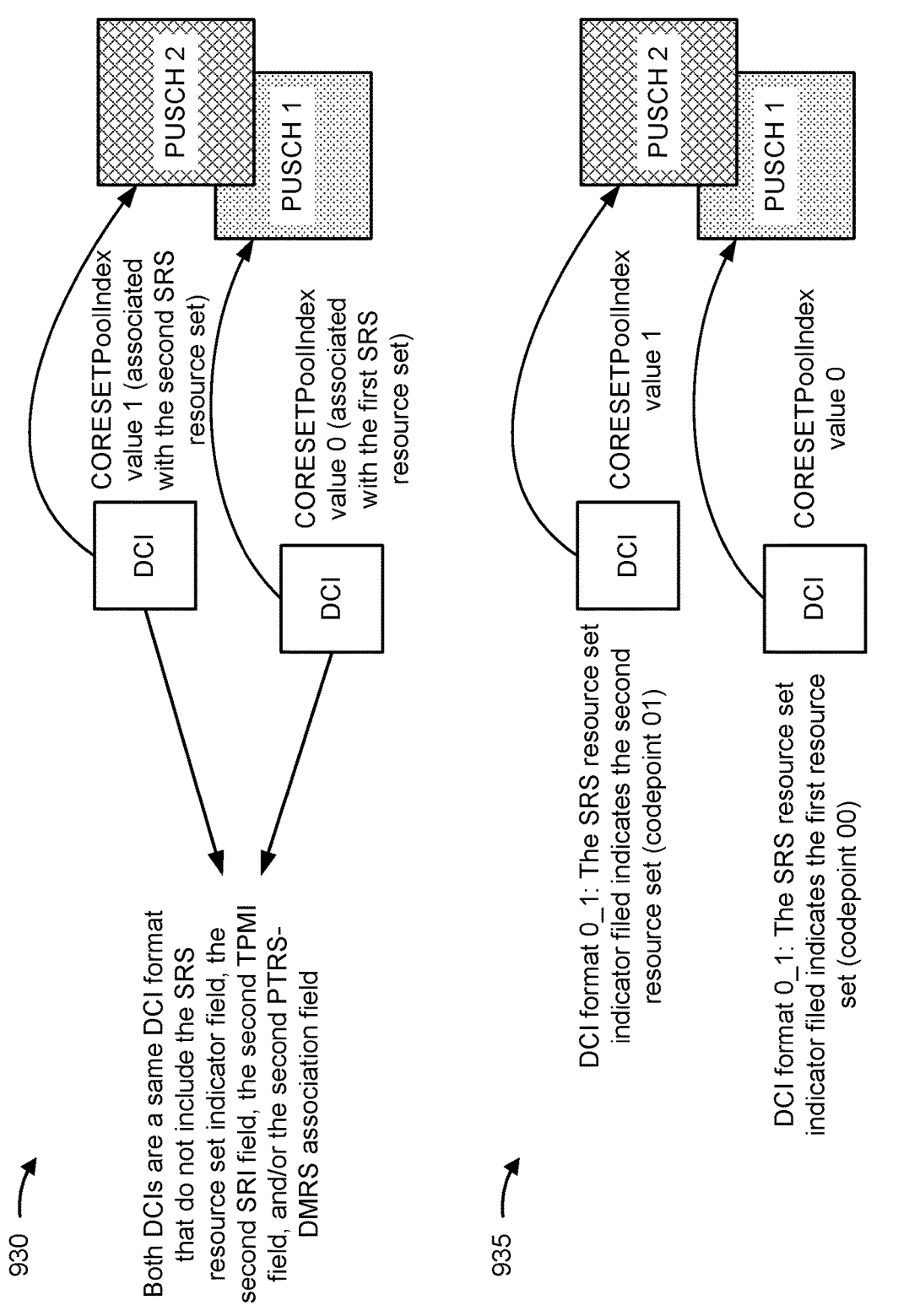

FIGS. 9A-9D are diagrams of an example 900 associated with DCI for sDCI and mDCI transmission modes, in accordance with the present disclosure. As shown in FIG. 9A, a network node 110 may communicate with a UE 120. In some aspects, the network node 110 and the UE 120 may be part of a wireless network (e.g., wireless network 100). The UE 120 and the network node 110 may have established a wireless connection prior to operations shown in FIG. 9A.

As shown by reference number 905, the UE 120 may transmit, and the network node 110 may receive, capability information (e.g., a capabilities report). In some aspects, the capability information may indicate UE support for operating in a simultaneous transmission mode associated with both an sDCI mode and an mDCI mode. More particularly, in some aspects the UE 120 may be capable of supporting overlapping (e.g., in the time domain) PUSCH transmissions associated with the sDCI mode and the mDCI mode (e.g., the UE 120 may be capable of transmitting a first PUSCH communication scheduled by an uplink DCI associated with the sDCI mode and a second PUSCH communication scheduled by an uplink DCI associated with the mDCI mode that at least partially overlaps with the first PUSCH communication). Accordingly, the UE 120 may transmit, and the network node 110 may receive, capability information indicating a capability of the UE 120 to support overlapping uplink communications associated with the sDCI mode and the mDCI mode.

As shown by reference number 910, the network node 110 may transmit, and the UE 120 may receive, configuration information. In some aspects, the UE 120 may receive the configuration information via one or more of RRC signaling, one or more MAC-CEs, and/or DCI, among other examples. In some aspects, the configuration information may include an indication of one or more configuration parameters (e.g., already known to the UE 120 and/or previously indicated by the network node 110 or other network device) for selection by the UE 120, and/or explicit configuration information for the UE 120 to use to configure the UE 120, among other examples.

In some aspects, the configuration information may indicate a configuration of at least two SRS resource sets. For example, the configuration information may configure any of the first SRS resource sets and the second SRS resource sets described above in connection with FIGS. 4-8. The configuration information may further indicate additional parameters associated with an sDCI mode, an mDCI mode, a simultaneous-transmission mode associated with overlapping PUSCH communications associated with both the sDCI mode and the mDCI mode, or similar configurations. For example, in aspects in which the UE 120 indicated support for overlapping uplink communications associated with the sDCI mode and the mDCI mode in connection with the capability information described above in connection with reference number 905, the configuration information may include a simultaneous-transmission configuration. In some aspects, the simultaneous-transmission indication may indicate whether one or more DCI communications are associated with one or both of the sDCI mode or the mDCI mode, as is described in more detail below in connection with reference numbers 920 and 925.

In some aspects, at least a portion of the configuration information may be associated with a particular BWP and/or a particular component carrier. Additionally, or alternatively, in some aspects, at least a portion of the configuration information may be associated with a particular DCI format. For example, in some aspects in which the configuration information includes the simultaneous-transmission configuration (e.g., information indicating whether one or more DCI communications are associated with one or both of the sDCI mode or the mDCI mode), the simultaneous-transmission configuration may be associated with at least one of a BWP or a component carrier. In some other aspects in which the configuration information includes the simultaneous-transmission configuration, the simultaneous-transmission configuration may be associated with at least one DCI format (e.g., one of DCI format 0_1 and/or DCI format 0_2). For example, in some aspects, the simultaneous-transmission configuration may indicate that a first DCI format (e.g., one of DCI format 0_1 or DCI format 0_2) is associated with the mDCI mode, and the simultaneous-transmission configuration may indicate that a second DCI format, different from the first DCI format (e.g., the other one of DCI format 0_1 or DCI format 0_2), is associated with the sDCI mode, which is described in more detail below in connection with reference numbers 920 and 925.

The UE 120 may configure itself based at least in part on the configuration information. In some aspects, the UE 120 may be configured to perform one or more operations described herein based at least in part on the configuration information.

As indicated by reference number 915, the network node 110 may transmit, and the UE 120 may receive, one or more DCI communications associated with one or more uplink communications. In some aspects, the one or more DCI communications may correspond to any of the uplink DCIs described above in connection with FIGS. 4-8 that schedule one or more PUSCH communications. In that regard, in some aspects, the one or more DCI communications may correspond to an uplink DCI associated with an sDCI mode, while, in some other aspects, the one or more DCI communications may correspond to an uplink DCI associated with an mDCI mode, while, in some other aspects, the one or more DCI communications may correspond to uplink DCIs associated with both an sDCI mode and an mDCI mode. For example, in some aspects, the one or more DCI communications may include at least two DCI communications, with a first DCI communication being associated with a first uplink communication (e.g., a first PUSCH communication) associated with the sDCI mode, and with a second DCI communication being associated with a second uplink communication (e.g., a second PUSCH communication) that at least partially overlaps, in the time domain, with the first uplink communication and that is associated with the mDCI mode. In such aspects, receiving the first DCI communication and the second DCI communication associated with the sDCI mode and the mDCI mode, respectively, may be based at least in part on the capability information described above in connection with reference number 905. More particularly, receiving the first DCI communication and the second DCI communication associated with the sDCI mode and the mDCI mode, respectively, may be based at least in part on the capability information indicating support for overlapping uplink communications associated with the sDCI mode and the mDCI mode.

As shown by reference number 920, the UE 120 may receive an indication of whether the one or more DCI communications are associated with one or both of the sDCI mode or the mDCI mode. In some aspects, the indication may be based at least in part on the configuration information (e.g., the configuration information configuring the at least two SRS resource sets, the configuration information associated with the simultaneous-transmission configuration, or similar information). Moreover, in some aspects the indication of whether the one or more DCI communications are associated with one or both of the sDCI mode or the mDCI mode may be associated with an explicit indication (e.g., explicit signaling from the network node 110 to the UE 120, as indicated using the unbroken arrow in FIG. 9A), such as an explicit RRC configuration enabling only one of the sDCI mode or the mDCI mode for simultaneous transmission, which is described in more detail below in connection with reference number 925. In some other aspects, the indication of whether the one or more DCI communications are associated with one or both of the sDCI mode or the mDCI mode may be associated with an implicit indication (e.g., an indication that is not associated with an explicit RRC configuration or the like, as indicated using the broken arrow in FIG. 9A), such as whether an active BWP is configured with at least two CORESETs that are associated with different CORESET pool index values, whether two SRS resource sets are associated with a DCI format used to schedule an uplink communication, or a similar implicit indication, which is described in more detail below in connection with reference number 925.

As shown by reference number 925, the UE 120 may determine whether one or more DCI communications (e.g., the one or more DCI communications described above in connection with reference number 915) are associated with the sDCI mode, the mDCI mode, or both the sDCI mode and the mDCI mode based at least in part on the indication described above in connection with reference number 920. In some aspects, determining whether the one or more DCI communications are associated with the sDCI mode, the mDCI mode, or both the sDCI mode and the mDCI mode may include determining whether one or more fields are included in the one or more DCI communications. Put another way, the indication of whether the one or more DCI communications are associated with one or both of the sDCI mode or the mDCI mode may indicate whether one or more fields are included in the one or more DCI communications. This may be because DCI communications associated the sDCI mode may include fields that are not included in DCI communications associated with the mDCI mode, such as an SRS resource set indicator field, a second SRI field, a second TPMI field, and/or a second PTRS-DMRS association field, as described above in connection with FIG. 8. Accordingly, in some aspects, determining whether one or more fields are included in the one or more DCI communications may include determining whether one or more of an SRS resource set indicator field, a second SRI field, a second TPMI field, and/or a second PTRS-DMRS association field are included in the one or more DCI communications.

In some aspects, such as in aspects in which only one of the sDCI mode or the mDCI may be configured semi-statically (e.g., a combination of the sDCI mode and the mDCI mode is not possible), the UE 120 may determine whether the one or more DCI communications are associated with the sDCI mode and/or the mDCI mode (e.g., the UE 120 may determine whether one or more of the SRS resource set indicator field, the second SRI field, the second TPMI field, and/or the second PTRS-DMRS association field are included in the one or more DCI communications) based at least in part on whether the configuration information configures an active BWP with at least two CORESETs associated with different CORESET pool index values. More particularly, when the configuration information configures the active BWP with at least two CORESETs associated with different CORESET pool index values, this may implicitly indicate to the UE 120 that the one or more DCI communications are associated with the mDCI mode, and thus the one or more fields (e.g., the SRS resource set indicator field, the second SRI field, the second TPMI field, and/or the second PTRS-DMRS association field) are not present in the one or more DCI communications. Put another way, in some aspects, by configuring the at least two SRS resource sets and the active BWP with at least two CORE-SETs associated with different CORESET pool index values, the configuration information enables the UE 120 to transmit time domain overlapping PUSCH communications in the same component carrier (e.g., mDCI mode for simultaneous transmissions).

Conversely, when the configuration information does not configure the active BWP with at least two CORESETs associated with different CORESET pool index values, the configuration information may implicitly indicate to the UE 120 that the one or more DCI communications are associated with the sDCI mode, and thus the one or more fields (e.g., the SRS resource set indicator field, the second SRI field, the second TPMI field, and/or the second PTRS-DMRS association field) are present in the one or more DCI communications. Put another way, in some aspects, the UE 120 may determine that the one or more DCI communications are associated with the sDCI mode based at least in part on the configuration information refraining from configuring the active BWP with the at least two CORESETs associated with the different CORESET pool index values.

In some aspects, such as in aspects in which only one of the sDCI mode or the mDCI may be configured semi-statically (e.g., a combination of the sDCI mode and the mDCI mode is not possible), the UE 120 may determine whether the one or more DCI communications are associated with the sDCI mode and/or the mDCI mode (e.g., the UE 120 may determine whether one or more of the SRS resource set indicator field, the second SRI field, the second TPMI field, and/or the second PTRS-DMRS association field are included in the one or more DCI communications) based at least in part on an explicit configuration (e.g., an explicit RRC configuration) configured per BWP and/or component carrier that only enables one mode for simultaneous transmissions for the corresponding BWP and/or component carrier.

For example, the network node 110 may transmit, and the UE 120 may receive, a simultaneous-transmission configuration associated with the indication of whether the one or more DCI communications are associated with one or both of the sDCI mode or the mDCI mode, such as the simultaneous-transmission configuration described above in connection with reference numbers 910 and 920. In some aspects, the simultaneous-transmission configuration may be associated with at least one of a BWP or a component carrier. Thus, in some aspects, the UE 120 may determine that the one or more DCI communications are associated with the mDCI mode based at least in part on the simultaneous-transmission configuration indicating that the mDCI mode is enabled for simultaneous transmissions associated with BWP and/or the component carrier in which a DCI communication is received. In such aspects, a configuration of two SRS resource sets and two CORESET pool index values may not necessarily mean that PUSCH transmissions associated with different CORESET pool values may be overlapping in time. Instead, in some aspects, PUSCH transmissions associated with different CORESET pool values may only be overlapping in time when the simultaneous-transmission configuration indicates that the mDCI mode is enabled for simultaneous transmissions.

Alternatively, in some other aspects, the UE 120 may determine that the one or more DCI communications are associated with the sDCI mode based at least in part on the simultaneous-transmission configuration indicating the mDCI mode is not enabled for simultaneous transmissions. For example, the simultaneous-transmission configuration may explicitly indicate that the mDCI mode is not enabled for simultaneous transmissions and/or may indicate that simultaneous transmissions are not enabled (meaning that PUSCH communications are associated with an sDCI mode). Additionally, or alternatively, the simultaneous-transmission configuration may indicate that one or more multiplexing modes associated with the sDCI mode is enabled for simultaneous transmissions, such as a spatial domain multiplexing (SDM) mode, a frequency domain multiplexing (FDM) mode, and/or a single frequency network (SFN) mode. In some other aspects, the simultaneous-transmission configuration may indicate that the simultaneous transmission is not enabled, meaning that none of the SDM mode, the FDM mode, or the SFN mode are enabled, and thus the UE 120 may determine that the one or more DCI communications are associated with a single DCI based TDM SRS transmission (e.g., associated with the sDCI mode).

In some aspects, the simultaneous-transmission configuration may be associated with at least one DCI format. For example, the simultaneous-transmission configuration may indicate that a first DCI format (e.g., one of DCI format 0_1 or DCI format 0_2) is associated with the mDCI mode, and that a second DCI format, different from the first DCI format (e.g., the other one of DCI format 0_1 or DCI format 0_2), is associated with the sDCI mode. This may enable dynamic switching between the sDCI mode and the mDCI mode, because the UE 120 may determine which mode is associated with a PUSCH communication based at least in part on the type of DCI format used for the uplink DCI. More particularly, in some aspects, the UE 120 may determine that a first DCI communication is associated with the mDCI mode (and thus does not include the SRS resource set indicator field, the second SRI field, the second TPMI field, and/or the second PTRS-DMRS association field) based at least in part on the first DCI communication being associated with the first DCI format, and/or the UE 120 may determine that a second DCI communication is associated with the sDCI mode (and thus does include the SRS resource set indicator field, the second SRI field, the second TPMI field, and/or the second PTRS-DMRS association field)

based at least in part on the second DCI communication being associated with the second DCI format.

In some aspects, when the simultaneous-transmission configuration indicates that the first DCI format (e.g., one of DCI format 0_1 or DCI format 0_2) is associated with the mDCI mode and that the second DCI format (e.g., the other one of DCI format 0_1 or DCI format 0_2) is associated with the sDCI mode, the UE 120 may not expect to be scheduled by two DCIs to transmit time-overlapping PUSCH communications (e.g., two PUSCH communications associated with different CORESET pool index values) in the same component carrier if at least one of the DCIs is associated with a DCI format associated with the sDCI mode (e.g., if at least one of the DCIs includes the SRS resource set indicator field, the second SRI field, the second TPMI field, and/or the second PTRS-DMRS association field). Put another way, and as shown by the example indicated by reference number 930 in FIG. 9B, in some aspects, in order to be scheduled by two DCIs to transmit time-overlapping PUSCH communications (e.g., two PUSCH communications associated with different CORESET pool index values) in the same component carrier, both DCIs may be associated with the DCI format configured to be associated with the mDCI mode (e.g., both DCIs may be associated with the DCI format that does not include the SRS resource set indicator field, the second SRI field, the second TPMI field, and/or the second PTRS-DMRS association field).

In some aspects, such as in aspects in which only one of the sDCI mode or the mDCI may be configured semi-statically (e.g., a combination of the sDCI mode and the mDCI mode is not possible), the UE 120 may determine whether the one or more DCI communications are associated with the sDCI mode and/or the mDCI mode (e.g., the UE 120 may determine whether one or more of the SRS resource set indicator field, the second SRI field, the second TPMI field, and/or the second PTRS-DMRS association field are included in the one or more DCI communications) based at least in part on whether two SRS resource sets are configured to be associated with a DCI format used to schedule a PUSCH communication. For example, the UE 120 may determine that a DCI communication is associated with the mDCI mode based at least in part on only one SRS resource set being associated with a DCI format used to transmit the DCI communication. Similarly, the UE 120 may determine that a DCI communication is associated with the sDCI mode based at least in part on two SRS resource sets being associated with the DCI format used to transmit the DCI communication.

In some aspects, when the UE 120 is scheduled by two DCIs to transmit time-overlapping PUSCH communications (e.g., PUSCH communications associated with different CORESET pool index values) in the same component carrier, the UE 120 may not expect one or more field (e.g., the SRS resource set indicator field) to be present in each of the two DCIs (e.g., indicating that only one SRS resource set associated with that DCI format is configured), and/or may expect that the SRS resource set indicator field indicates only one SRS resource set (e.g., the SRS resource set indicator indicates one of codepoint 00 or codepoint 01). More particularly, as shown by the example indicated reference number 925 in FIG. 9B, in some aspects a first DCI scheduling a first PUSCH communication and associated with a first CORESET pool index value (e.g., CORESET pool index value 0) may be transmitted using a first DCI format (e.g., DCI format 0_1 in the depicted example, but which may be DCI format 0_2 in other examples) that indicates a first SRS resource set, such as by including an SRS resource set indicator field indicating codepoint 00. Moreover, a second DCI scheduling a second PUSCH communication that at least partially overlaps with the first PUSCH communication and that is associated with a first CORESET pool index value (e.g., CORESET pool index value 0) may also be transmitted using the first DCI format (e.g., DCI format 0_1), but which indicates a second SRS resource set, such as by including an SRS resource set indicator field indicating codepoint 01.

Put another way, in some aspects, the same DCI format (e.g., one of DCI format 0_1 or DCI format 0_2) may be used to schedule PUSCH communications associated with the mDCI mode and PUSCH communications associated with the sDCI mode. In such aspects, when an SRS resource set indicator field of a DCI indicates one SRS resource set (e.g., when SRS resource set indicator field indicates codepoint 01 or codepoint 10 to schedule a PUSCH communication associated with the mDCI mode, such as is shown in the example indicated by reference number 935), another PUSCH communication (e.g., a PUSCH communication scheduled by another DCI) in the same component carrier may overlap in time with the PUSCH communication. However, when an SRS resource set indicator field of a DCI indicates two SRS resource sets (e.g., when SRS resource set indicator field indicates codepoint 10 or codepoint 11 to schedule a PUSCH communication associated with the sDCI mode), no other PUSCH communications in the same component carrier may overlap in time with the PUSCH communication.

In some aspects both the sDCI mode and the mDCI may be configured semi-statically (e.g., a combination of the sDCI mode and the mDCI mode is possible). In such aspects, the UE 120 may determine that the one or more DCI communications include both a DCI communication associated with the sDCI mode (e.g., a DCI communication that includes one or more of the SRS resource set indicator field, the second SRI field, the second TPMI field, and/or the second PTRS-DMRS association field) and a DCI communication associated with the mDCI mode (e.g., a DCI communication that does not include one or more of the SRS resource set indicator field, the second SRI field, the second TPMI field, and/or the second PTRS-DMRS association field). More particularly, the UE 120 may be configured to receive, from the network node 110, a first DCI communication associated with a first uplink communication (e.g., a first PUSCH communication associated with a first CORESET pool index value), with the first DCI communication being associated with the sDCI mode, as well as a second DCI communication associated with a second uplink communication (e.g., a second PUSCH communication associated with a second CORESET pool index value) that at least partially overlaps, in the time domain, with the first uplink communication, with the second DCI communication being associated with the mDCI mode.

In such aspects, at least one of the DCI communications may indicate that two SRS resource sets are associated with the corresponding uplink communication. For example, the first DCI communication (e.g., the DCI communication associated with the sDCI mode in the above-described example) may indicate that two SRS resource sets are associated with the first uplink communication. For example, the first DCI communication may indicate that the two SRS resource sets are associated with the first uplink communication via an SRS resource set indicator field associated with the first DCI communication indicating at least one of codepoint 10 or codepoint 11.

In some aspects, a combination of an sDCI mode and an mDCI mode may be subject to UE 120 capability. For example, receiving the first DCI communication (e.g., the DCI communication associated with the sDCI mode) and the second DCI communication (e.g., the DCI communication associated with the mDCI mode) may be based at least in part on capability information (e.g., the capability information described above in connection with reference number 905) indicating a capability of the UE 120 to support overlapping uplink communications associated with the sDCI mode and the mDCI mode. Additionally, or alternatively, in order to operate with a combination of the sDCI mode and the mDCI mode, the DCI communication associated with the sDCI mode (e.g., the DCI communication that indicates the two SRS resource sets) may be restricted to scheduling two sets of PUSCH repetitions (e.g., the two sets of PUSCH repetitions described above in connection with FIG. 5, the two sets of PUSCH repetitions described above in connection with reference numbers 608 and 610 in FIG. 6A, or similar sets of PUSCH repetitions) in a TDM manner. Put another way, in some aspects, the DCI communication associated with the sDCI mode may not be used to schedule SDM based PUSCH communications, FDM based PUSCH communications, and/or SFN based PUSCH communications. Additionally, or alternatively, in order to operate with a combination of the sDCI mode and the mDCI mode, at any given time (e.g., in any given OFDM symbol), a UE 120 may not be expected to transmit a first PUSCH repetition associated with a first PUSCH communication and a second PUSCH repetition associated with a second PUSCH communication if the first PUSCH repetition and the second PUSCH repetition are associated with the same SRS resource set (e.g., in any given OFDM symbol, the UE 120 may be expected to transmit only a single PUSCH repetition associated with a given SRS resource set).

In some aspects, when operating according to the combination of the sDCI mode and the mDCI mode, two SRS resource sets may be shared for the two CORESET pool index values (e.g., each of the CORESET pool index values may be associated with the same two SRS resource sets). In some other aspects, however, SRS resource sets may separate for the two CORESET pool index values (e.g., each of the CORESET pool index values may be associated with different sets of two SRS resource sets).

More particularly, FIG. 9C shows examples 940, 945 in which two SRS resource sets may be shared for the two CORESET pool index values. In the examples shown in FIG. 9C, a UE 120 may detect two DCI communications scheduling corresponding PUSCH communications, shown as "PUSCH 1" and "PUSCH 2" in FIG. 9C. A first DCI communication, of the two DCI communications (e.g., a DCI communication used to schedule PUSCH 1) may be associated with CORESET pool index value 0 (e.g., the first DCI communication may be detected in a CORESET associated with CORESET pool index value 0), and a second DCI communication, of the two DCI communications (e.g., a DCI communication used to schedule PUSCH 2) may be associated with CORESET pool index value 1 (e.g., the second DCI communication may be detected in a CORESET associated with CORESET pool index value 1).

Moreover, in the examples depicted in FIG. 9C, the PUSCH 1 (e.g., the PUSCH communication scheduled by the DCI associated with CORESET pool index value 0) and the PUSCH 2 (e.g., the PUSCH communication scheduled by the DCI associated with CORESET pool index value 1) may be associated with the same two SRS resource sets. Put another way, the first CORESET pool index value may be associated with two SRS resource sets, of the at least two configured SRS resource sets, and the second CORESET pool index value may also be associated with the two SRS resource sets, of the at least two configured SRS resource sets.

More particularly, in the example 940, the first DCI communication may be associated with the sDCI mode, and the PUSCH 1 may be associated with two sets of PUSCH repetitions, similar to the PUSCH communication described above in connection with FIG. 5 (e.g., the first and third PUSCH repetitions may be associated with the first SRS resource set, and the second and fourth repetitions may be associated with the second SRS resource set). Moreover, the second DCI communication may be associated with the mDCI mode, and PUSCH 2 may be associated with one of the two SRS resource sets associated with the PUSCH 1 (here, the second SRS resource set). In the example 945, both the first DCI communication and the second DCI communication may be associated with the sDCI mode, and thus both PUSCH 1 and PUSCH 2 may be associated with PUSCH repetitions associated with the two SRS resource sets. In such examples, the PUSCH 1 and the PUSCH 2 may be associated with a different order of the PUSCH repetitions such that PUSCH repetitions associated with the same SRS resource set do not overlap in the time domain. For example, with respect to the PUSCH 1, the first and third PUSCH repetitions may be associated with the first SRS resource set and the second and fourth repetitions may be associated with the second SRS resource, and, with respect to the PUSCH 2, the first and third PUSCH repetitions may be associated with the second SRS resource set and the second and fourth repetitions may be associated with the first SRS resource set.

Alternatively, SRS resource sets may be separate (e.g., distinct) for the two CORSET pool index values, and up to four SRS resource sets may be configured for the same DCI format, such that DCIs received in a CORESET associated with CORESET pool index value 0 may indicate one or more SRS resource sets of a first set two SRS resource sets, and DCIs received in a CORESET associated with CORESET pool index value 1 may indicate one or more SRS resource sets of a second set of two SRS resource sets. More particularly, in the examples depicted in FIG. 9D, the PUSCH 1 (e.g., the PUSCH communication scheduled by the DCI associated with CORESET pool index value 0) and the PUSCH 2 (e.g., the PUSCH communication scheduled by the DCI associated with CORESET pool index value 1) are shown as being associated with separate SRS resource sets. Put another way, the first CORESET pool index value may be associated with a first set of two SRS resource sets, of the at least two configured SRS resource sets, and the second CORESET pool index value may be associated with a second set of two SRS resource sets, of the at least two configured SRS resource sets.

Figure 9D:
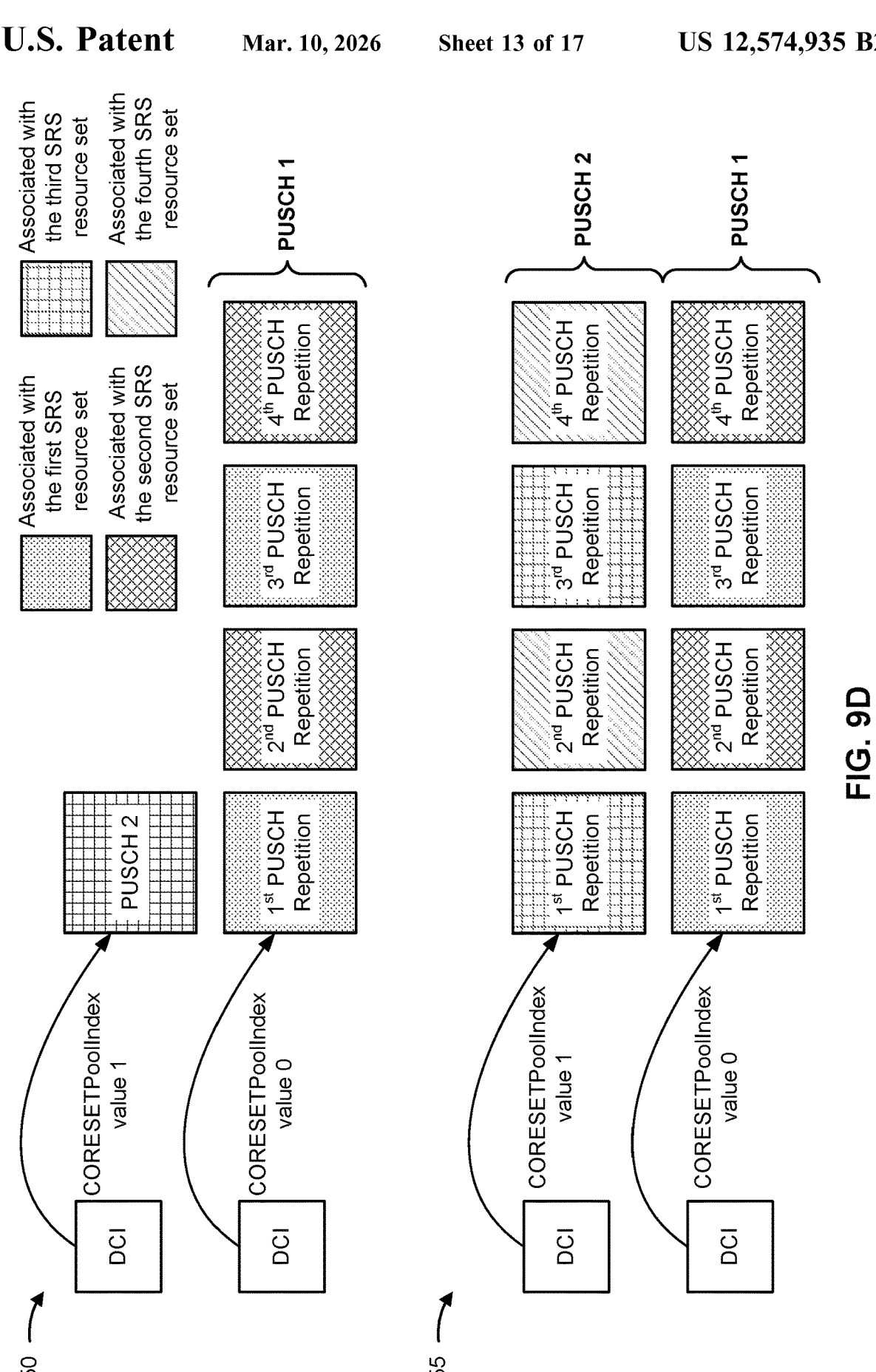

More particularly, in the example indicated by reference number 950, the first DCI communication may be associated with the sDCI mode, and the PUSCH 1 may be associated with two sets of PUSCH repetitions, similar to the PUSCH communication described above in connection with FIG. 5 (e.g., the first and third PUSCH repetitions may be associated with the first SRS resource set, and the second and fourth repetitions may be associated with the second SRS resource set). Moreover, the second DCI communication may be associated with the mDCI mode, and PUSCH 2 may be associated with one of two other SRS resource sets (e.g., one of a third SRS resource set or a fourth SRS resource, such as the third SRS resource set as shown in FIG. 9D). In the example indicated by reference number 955, both the first DCI communication and the second DCI communication may be associated with the sDCI mode, and thus both PUSCH 1 and PUSCH 2 may be associated with PUSCH repetitions associated with the two SRS resource sets. In such examples, the PUSCH 1 may be associated with a different set of two SRS resource sets than the PUSCH 2. For example, with respect to the PUSCH 1, the first and third PUSCH repetitions may be associated with the first SRS resource set and the second and fourth repetitions may be associated with the second SRS resource set, while, with respect to the PUSCH 2, the first and third PUSCH repetitions may be associated with the third SRS resource set and the second and fourth repetitions may be associated with the fourth SRS resource set. Alternatively, in aspects in which only three SRS resource sets are configured, the second and fourth repetitions of the PUSCH 2 may be associated with the third resource set.

Based at least in part on the UE 120 and/or the network node 110 distinguishing between sDCI modes and mDCI modes, dynamically switching between sDCI modes and mDCI modes, and/or operating with a combination of the sDCI modes and mDCI modes, the UE 120 and/or the network node 110 may conserve computing, power, network, and/or communication resources that may have otherwise been consumed legacy sDCI mode and mDCI mode procedures. For example, based at least in part on the UE 120 and/or the network node 110 distinguishing between sDCI modes and mDCI modes, dynamically switching between sDCI modes and mDCI modes, and/or operating with a combination of the sDCI modes and mDCI modes, the UE 120 and the network node 110 may communicate with an increased capacity and/or a reduced error rate, which may conserve computing, power, network, and/or communication resources that may have otherwise been consumed to transmit and receive communications and/or to detect and/or correct communication errors.

As indicated above, FIGS. 9A-9D are provided as examples. Other examples may differ from what is described with respect to FIGS. 9A-9D.

FIG. 10 is a diagram illustrating an example process 1000 performed, for example, by a UE, in accordance with the present disclosure. Example process 1000 is an example where the UE (e.g., UE 120) performs operations associated with DCI for single DCI and multiple DCI transmission modes.

As shown in FIG. 10, in some aspects, process 1000 may include receiving, from a network node, configuration information indicating a configuration of at least two SRS resource sets (block 1010). For example, the UE (e.g., using communication manager 140 and/or reception component 1202) depicted in FIG. 12 may receive, from a network node, configuration information indicating a configuration of at least two SRS resource sets, as described above.

As further shown in FIG. 10, in some aspects, process 1000 may include receiving one or more DCI communications associated with one or more uplink communications (block 1020). For example, the UE (e.g., using communication manager 140 and/or reception component 1202) depicted in FIG. 12 may receive one or more DCI communications associated with one or more uplink communications, as described above.

As further shown in FIG. 10, in some aspects, process 1000 may include receiving, from the network node, an indication of whether the one or more DCI communications are associated with one or both of an sDCI mode or an mDCI mode, wherein the indication is based at least in part on the configuration information (block 1030). For example, the UE (e.g., using communication manager 140 and/or reception component 1202, depicted in FIG. 12) may receive, from the network node, an indication of whether the one or more DCI communications are associated with one or both of an sDCI mode or an mDCI mode, wherein the indication is based at least in part on the configuration information, as described above.

Process 1000 may include additional aspects, such as any single aspect or any combination of aspects described below and/or in connection with one or more other processes described elsewhere herein.

In a first aspect, the indication of whether the one or more DCI communications are associated with one or both of the sDCI mode or the mDCI mode indicates whether one or more fields are included in the one or more DCI communications.

In a second aspect, alone or in combination with the first aspect, the one or more fields include at least one of an SRS resource set indicator field, a second SRS resource indicator field, a second transmitted precoding matrix indicator field, or a second phase tracking reference signal and demodulation reference signal association field.

In a third aspect, alone or in combination with one or more of the first and second aspects, the indication of whether the one or more DCI communications are associated with one or both of the sDCI mode or the mDCI mode is based at least in part on whether the configuration information configures an active BWP with at least two CORESETs associated with different CORESET pool index values.

In a fourth aspect, alone or in combination with one or more of the first through third aspects, process 1000 includes determining that the one or more DCI communications are associated with the mDCI mode based at least in part on the configuration information configuring the active BWP with the at least two CORESETs associated with the different CORESET pool index values.

In a fifth aspect, alone or in combination with one or more of the first through fourth aspects, process 1000 includes determining that the one or more DCI communications are associated with the sDCI mode based at least in part on the configuration information refraining from configuring the active BWP with the at least two CORESETs associated with the different CORESET pool index values.

In a sixth aspect, alone or in combination with one or more of the first through fifth aspects, process 1000 includes receiving, from the network node, a simultaneous-transmission configuration associated with the indication of whether the one or more DCI communications are associated with one or both of the sDCI mode or the mDCI mode.

In a seventh aspect, alone or in combination with one or more of the first through sixth aspects, the simultaneous-transmission configuration is associated with at least one of a bandwidth part or a component carrier.

In an eighth aspect, alone or in combination with one or more of the first through seventh aspects, process 1000 includes determining that the one or more DCI communications are associated with the mDCI mode based at least in part on the simultaneous-transmission configuration indicating that the mDCI mode is enabled for simultaneous transmissions.

In a ninth aspect, alone or in combination with one or more of the first through eighth aspects, process 1000 includes determining that the one or more DCI communications are associated with the sDCI mode based at least in part on the simultaneous-transmission configuration indicating the mDCI mode is not enabled for simultaneous transmissions and the simultaneous-transmission configuration indicating at least one of a spatial domain multiplexing mode is enabled for simultaneous transmissions, a frequency domain multiplexing mode is enabled for simultaneous transmissions, or a single frequency network mode is enabled for simultaneous transmissions.

In a tenth aspect, alone or in combination with one or more of the first through ninth aspects, the simultaneous-transmission configuration is associated with at least one DCI format.

In an eleventh aspect, alone or in combination with one or more of the first through tenth aspects, the simultaneous-transmission configuration indicates that a first DCI format is associated with the mDCI mode, and the simultaneous-transmission configuration indicates that a second DCI format, different from the first DCI format, is associated with the sDCI mode.

In a twelfth aspect, alone or in combination with one or more of the first through eleventh aspects, process 1000 includes determining that a first DCI communication is associated with the mDCI mode based at least in part on the first DCI communication being associated with the first DCI format, and determining that a second DCI communication is associated with the sDCI mode based at least in part on the second DCI communication being associated with the second DCI format.

In a thirteenth aspect, alone or in combination with one or more of the first through twelfth aspects, the indication of whether the one or more DCI communications are associated with one or both of the sDCI mode or the mDCI mode is based at least in part on whether two SRS resource sets, of the at least two SRS resource sets, are associated with a DCI format associated with the one or more DCI communications.

In a fourteenth aspect, alone or in combination with one or more of the first through thirteenth aspects, process 1000 includes determining that the one or more DCI communications are associated with the mDCI mode based at least in part on only one SRS resource set, of the at least two SRS resource sets, being associated with the DCI format associated with the DCI communications.

In a fifteenth aspect, alone or in combination with one or more of the first through fourteenth aspects, process 1000 includes determining that the one or more DCI communications are associated with the sDCI mode based at least in part on two SRS resource sets, of the at least two SRS resource sets, being associated with the DCI format associated with the DCI communications.

In a sixteenth aspect, alone or in combination with one or more of the first through fifteenth aspects, process 1000 includes receiving, from the network node, a first DCI communication, of the one or more DCI communications, associated with a first uplink communication, wherein the first DCI communication is associated with the sDCI mode, and receiving, from the network node, a second DCI communication, of the one or more DCI communications, associated with a second uplink communication that at least partially overlaps, in the time domain, with the first uplink communication, wherein the second DCI communication is associated with the mDCI mode.

In a seventeenth aspect, alone or in combination with one or more of the first through sixteenth aspects, the first DCI communication indicates that two SRS resource sets, of the at least two SRS resource sets, are associated with the first uplink communication.

In an eighteenth aspect, alone or in combination with one or more of the first through seventeenth aspects, the first DCI communication indicates that the two SRS resource sets are associated with the first uplink communication via an SRS resource set indicator field associated with the first DCI communication indicating at least one of codepoint 10 or codepoint 11.

In a nineteenth aspect, alone or in combination with one or more of the first through eighteenth aspects, process 1000 includes transmitting, to the network node, capability information indicating a capability to support overlapping uplink communications associated with the sDCI mode and the mDCI mode, wherein receiving the first DCI communication and the second DCI communication is based at least in part on the capability information.

In a twentieth aspect, alone or in combination with one or more of the first through nineteenth aspects, the first DCI communication is associated with a first CORESET pool index value, and the second DCI communication is associated with a second CORESET pool index value.

In a twenty-first aspect, alone or in combination with one or more of the first through twentieth aspects, the first CORESET pool index value is associated with two SRS resource sets, of the at least two SRS resource sets, and the second CORESET pool index value is associated with the two SRS resource sets, of the at least two SRS resource sets.

In a twenty-second aspect, alone or in combination with one or more of the first through twenty-first aspects, the first CORESET pool index value is associated with a first set of two SRS resource sets, of the at least two SRS resource sets, and wherein the second CORESET pool index value is associated with a second set of two SRS resource sets, of the at least two SRS resource sets.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a network node, in accordance with the present disclosure. Example process 1100 is an example where the network node (e.g., network node 110) performs operations associated with DCI for single DCI and multiple DCI transmission modes.

As shown in FIG. 11, in some aspects, process 1100 may include transmitting, to a UE, configuration information indicating a configuration of at least two SRS resource sets (block 1110). For example, the network node (e.g., using communication manager 150, transmission component 1304, and/or configuration component 1308, depicted in FIG. 13) may transmit, to a UE, configuration information indicating a configuration of at least two SRS resource sets, as described above.

As further shown in FIG. 11, in some aspects, process 1100 may include transmitting, to the UE, one or more DCI communications associated with one or more uplink communications (block 1120). For example, the network node (e.g., using communication manager 150 and/or transmission component 1304, depicted in FIG. 13) may transmit, to the UE, one or more DCI communications associated with one or more uplink communications, as described above.

As further shown in FIG. 11, in some aspects, process 1100 may include indicating, to the UE, whether the one or more DCI communications are associated with one or both of an sDCI mode or an mDCI mode based at least in part on the configuration information, wherein the indication is based at least in part on the configuration information (block 1130). For example, the network node (e.g., using communication manager 150 and/or indication component 1310, depicted in FIG. 13) may indicate, to the UE, whether the one or more DCI communications are associated with one or both of an sDCI mode or an mDCI mode based at least in part on the configuration information, wherein the indication is based at least in part on the configuration information, as described above.

Process 1100 may include additional aspects, such as any single aspect or any combination of aspects described below and/or in connection with one or more other processes described elsewhere herein.

In a first aspect, indicating whether the one or more DCI communications are associated with one or both of the sDCI mode or the mDCI mode further indicates whether one or more fields are included in the one or more DCI communications.

In a second aspect, alone or in combination with the first aspect, the one or more fields include at least one of an SRS resource set indicator field, a second SRS resource indicator field, a second transmitted precoding matrix indicator field, or a second phase tracking reference signal and demodulation reference signal association field.

In a third aspect, alone or in combination with one or more of the first and second aspects, indicating whether the one or more DCI communications are associated with one or both of the sDCI mode or the mDCI mode is based at least in part on whether the configuration information configures an active BWP with at least two CORESETs associated with different CORESET pool index values.

In a fourth aspect, alone or in combination with one or more of the first through third aspects, process 1100 includes indicating that the one or more DCI communications are associated with the mDCI mode based at least in part on the configuration information configuring the active BWP with the at least two CORESETs associated with the different CORESET pool index values.

In a fifth aspect, alone or in combination with one or more of the first through fourth aspects, process 1100 includes indicating that the one or more DCI communications are associated with the sDCI mode based at least in part on the configuration information refraining from configuring the active BWP with the at least two CORESETs associated with the different CORESET pool index values.

In a sixth aspect, alone or in combination with one or more of the first through fifth aspects, process 1100 includes transmitting, to the UE, a simultaneous-transmission configuration associated with indicating whether the one or more DCI communications are associated with one or both of the sDCI mode or the mDCI mode.

In a seventh aspect, alone or in combination with one or more of the first through sixth aspects, the simultaneous-transmission configuration is associated with at least one of a bandwidth part or a component carrier.

In an eighth aspect, alone or in combination with one or more of the first through seventh aspects, process 1100 includes indicating that the one or more DCI communications are associated with the mDCI mode based at least in part on the simultaneous-transmission configuration indicating that the mDCI mode is enabled for simultaneous transmissions.

In a ninth aspect, alone or in combination with one or more of the first through eighth aspects, process 1100 includes indicating that the one or more DCI communications are associated with the sDCI mode based at least in part on the simultaneous-transmission configuration indicating that a simultaneous transmission mode is not enabled.

In a tenth aspect, alone or in combination with one or more of the first through ninth aspects, process 1100 includes indicating that the one or more DCI communications are associated with the sDCI mode based at least in part on the simultaneous-transmission configuration indicating at least one of a spatial domain multiplexing mode is enabled for simultaneous transmissions, a frequency domain multiplexing mode is enabled for simultaneous transmissions, or a single frequency network mode is enabled for simultaneous transmissions.

In an eleventh aspect, alone or in combination with one or more of the first through tenth aspects, the simultaneous-transmission configuration is associated with at least one DCI format.

In a twelfth aspect, alone or in combination with one or more of the first through eleventh aspects, the simultaneous-transmission configuration indicates that a first DCI format is associated with the mDCI mode, and the simultaneous-transmission configuration indicates that a second DCI format, different from the first DCI format, is associated with the sDCI mode.

In a thirteenth aspect, alone or in combination with one or more of the first through twelfth aspects, process 1100 includes transmitting, to the UE, a first DCI communication associated with the mDCI mode using the first DCI format, and transmitting, to the UE, a second DCI communication associated with the sDCI mode using the second DCI format.

In a fourteenth aspect, alone or in combination with one or more of the first through thirteenth aspects, indicating whether the one or more DCI communications are associated with one or both of the sDCI mode or the mDCI mode is based at least in part on whether two SRS resource sets, of the at least two SRS resource sets, are associated with a DCI format associated with the one or more DCI communications.

In a fifteenth aspect, alone or in combination with one or more of the first through fourteenth aspects, process 1100 includes indicating that the one or more DCI communications are associated with the mDCI mode based at least in part on only one SRS resource set, of the at least two SRS resource sets, being associated with the DCI format associated with the DCI communications.

In a sixteenth aspect, alone or in combination with one or more of the first through fifteenth aspects, process 1100 includes indicating that the one or more DCI communications are associated with the sDCI mode based at least in part on two SRS resource sets, of the at least two SRS resource sets, being associated with the DCI format associated with the DCI communications.

In a seventeenth aspect, alone or in combination with one or more of the first through sixteenth aspects, process 1100 includes transmitting, to the UE, a first DCI communication, of the one or more DCI communications, associated with a first uplink communication, wherein the first DCI communication is associated with the sDCI mode, and transmitting, to the UE, a second DCI communication, of the one or more DCI communications, associated with a second uplink communication that at least partially overlaps, in the time domain, with the first uplink communication, wherein the second DCI communication is associated with the mDCI mode.

In an eighteenth aspect, alone or in combination with one or more of the first through seventeenth aspects, the first DCI communication indicates that two SRS resource sets, of the at least two SRS resource sets, are associated with the first uplink communication.

In a nineteenth aspect, alone or in combination with one or more of the first through eighteenth aspects, the first DCI communication indicates that the two SRS resource sets are associated with the first uplink communication via an SRS resource set indicator field associated with the first DCI communication indicating at least one of codepoint 10 or codepoint 11.

In a twentieth aspect, alone or in combination with one or more of the first through nineteenth aspects, process 1100 includes receiving, from the UE, capability information indicating a capability of the UE to support overlapping uplink communications associated with the sDCI mode and the mDCI mode, wherein transmitting the first DCI communication and the second DCI communication is based at least in part on the capability information.

In a twenty-first aspect, alone or in combination with one or more of the first through twentieth aspects, the first DCI communication is associated with a first CORESET pool index value, and the second DCI communication is associated with a second CORESET pool index value.

In a twenty-second aspect, alone or in combination with one or more of the first through twenty-first aspects, the first CORESET pool index value is associated with two SRS resource sets, of the at least two SRS resource sets, and the second CORESET pool index value is associated with the two SRS resource sets, of the at least two SRS resource sets.

In a twenty third aspect, alone or in combination with one or more of the first through twenty-second aspects, the first CORESET pool index value is associated with a first set of two SRS resource sets, of the at least two SRS resource sets, and the second CORESET pool index value is associated with a second set of two SRS resource sets, of the at least two SRS resource sets.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
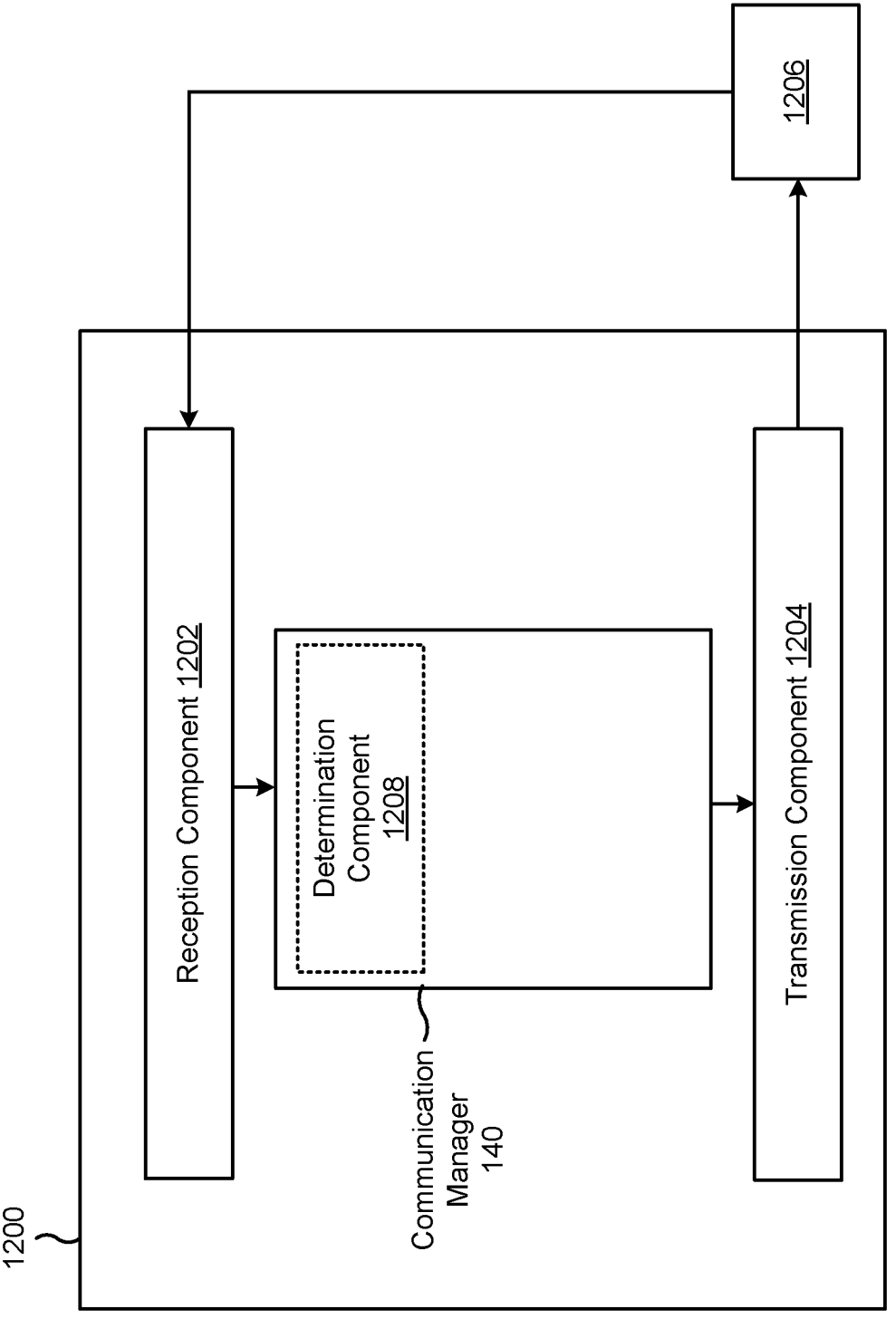
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a UE (e.g., UE 120), or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a network node, or another wireless communication device) using the reception component 1202 and the transmission component 1204. As further shown, the apparatus 1200 may include the communication manager 140. The communication manager 140 may include a determination component 1208, among other examples.

In some aspects, the apparatus 1200 may be configured to perform one or more operations described herein in connection with FIGS. 9A-9D. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE 120 described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE 120 described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE 120 described in connection with FIG. 2. In some aspects, the transmission component 1204 may be co-located with the reception component 1202 in a transceiver.

The reception component 1202 may receive, from a network node, configuration information indicating a configuration of at least two SRS resource sets. The reception component 1202 may receive one or more DCI communications associated with one or more uplink communications. The reception component 1202 may receive, from the network node, an indication of whether the one or more DCI communications are associated with one or both of an sDCI mode or an mDCI mode, wherein the indication is based at least in part on the configuration information.

The determination component 1208 may determine that the one or more DCI communications are associated with the mDCI mode based at least in part on the configuration information configuring the active BWP with the at least two CORESETs associated with the different CORESET pool index values.

The determination component 1208 may determine that the one or more DCI communications are associated with the sDCI mode based at least in part on the configuration information refraining from configuring the active BWP with the at least two CORESETs associated with the different CORESET pool index values.

The reception component 1202 may receive, from the network node, a simultaneous-transmission configuration associated with the indication of whether the one or more DCI communications are associated with one or both of the sDCI mode or the mDCI mode.

The determination component 1208 may determine that the one or more DCI communications are associated with the mDCI mode based at least in part on the simultaneous-transmission configuration indicating that the mDCI mode is enabled for simultaneous transmissions.

The determination component 1208 may determine that the one or more DCI communications are associated with the sDCI mode based at least in part on the simultaneous-transmission configuration indicating the mDCI mode is not enabled for simultaneous transmissions and the simultaneous-transmission configuration indicating at least one of a spatial domain multiplexing mode is enabled for simultaneous transmissions, a frequency domain multiplexing mode is enabled for simultaneous transmissions, or a single frequency network mode is enabled for simultaneous transmissions.

The determination component 1208 may determine that a first DCI communication is associated with the mDCI mode based at least in part on the first DCI communication being associated with the first DCI format.

The determination component 1208 may determine that a second DCI communication is associated with the sDCI mode based at least in part on the second DCI communication being associated with the second DCI format.

The determination component 1208 may determine that the one or more DCI communications are associated with the mDCI mode based at least in part on only one SRS resource set, of the at least two SRS resource sets, being associated with the DCI format associated with the DCI communications.

The determination component 1208 may determine that the one or more DCI communications are associated with the sDCI mode based at least in part on two SRS resource sets, of the at least two SRS resource sets, being associated with the DCI format associated with the DCI communications.

The reception component 1202 may receive, from the network node, a first DCI communication, of the one or more DCI communications, associated with a first uplink communication, wherein the first DCI communication is associated with the sDCI mode.

The reception component 1202 may receive, from the network node, a second DCI communication, of the one or more DCI communications, associated with a second uplink communication that at least partially overlaps, in the time domain, with the first uplink communication, wherein the second DCI communication is associated with the mDCI mode.

The transmission component 1204 may transmit, to the network node, capability information indicating a capability to support overlapping uplink communications associated with the sDCI mode and the mDCI mode, wherein receiving the first DCI communication and the second DCI communication is based at least in part on the capability information.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
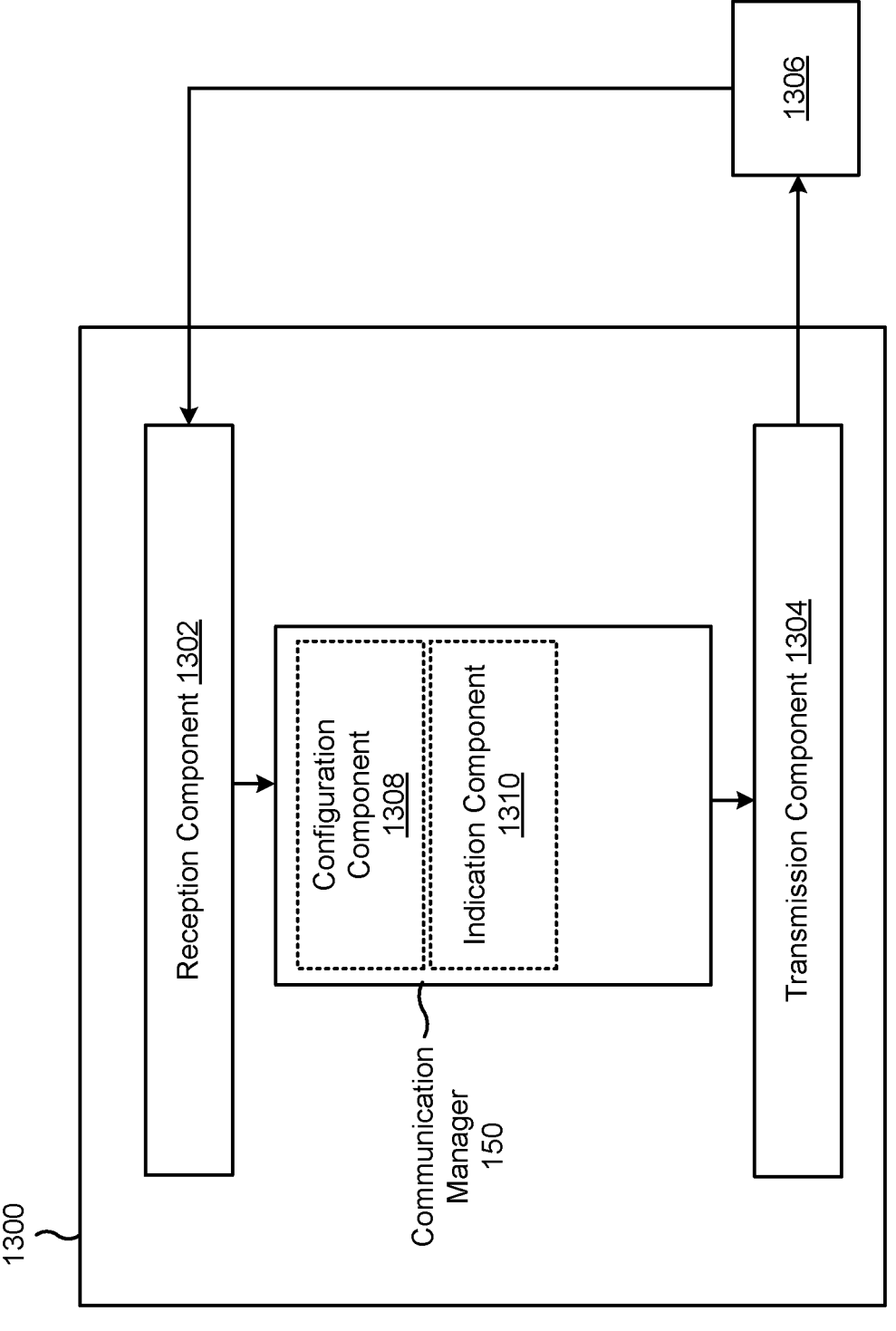
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a network node (e.g., network node 110), or a network node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a network node, or another wireless communication device) using the reception component 1302 and the transmission component 1304. As further shown, the apparatus 1300 may include the communication manager 150. The communication manager 150 may include one or more of a configuration component 1308 or an indication component 1310, among other examples.

In some aspects, the apparatus 1300 may be configured to perform one or more operations described herein in connection with FIGS. 9A-9D. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the network node 110 described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node 110 described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component

1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network node 110 described in connection with FIG. 2. In some aspects, the transmission component 1304 may be co-located with the reception component 1302 in a transceiver.

The transmission component 1304 and/or the configuration component 1308 may transmit, to a UE, configuration information indicating a configuration of at least two SRS resource sets. The transmission component 1304 may transmit, to the UE, one or more DCI communications associated with one or more uplink communications. The indication component 1310 may indicate, to the UE, whether the one or more DCI communications are associated with one or both of an sDCI mode or an mDCI mode based at least in part on the configuration information, wherein the indication is based at least in part on the configuration information.

The indication component 1310 may indicate that the one or more DCI communications are associated with the mDCI mode based at least in part on the configuration information configuring the active BWP with the at least two CORESETs associated with the different CORESET pool index values.

The indication component 1310 may indicate that the one or more DCI communications are associated with the sDCI mode based at least in part on the configuration information refraining from configuring the active BWP with the at least two CORESETs associated with the different CORESET pool index values.

The transmission component 1304 and/or the configuration component 1308 may transmit, to the UE, a simultaneous-transmission configuration associated with indicating whether the one or more DCI communications are associated with one or both of the sDCI mode or the mDCI mode.

The indication component 1310 may indicate that the one or more DCI communications are associated with the mDCI mode based at least in part on the simultaneous-transmission configuration indicating that the mDCI mode is enabled for simultaneous transmissions.

The indication component 1310 may indicate that the one or more DCI communications are associated with the sDCI mode based at least in part on the simultaneous-transmission configuration indicating that a simultaneous transmission mode is not enabled.

The indication component 1310 may indicate that the one or more DCI communications are associated with the sDCI mode based at least in part on the simultaneous-transmission configuration indicating at least one of a spatial domain multiplexing mode is enabled for simultaneous transmissions, a frequency domain multiplexing mode is enabled for simultaneous transmissions, or a single frequency network mode is enabled for simultaneous transmissions.

The transmission component 1304 may transmit, to the UE, a first DCI communication associated with the mDCI mode using the first DCI format.

The transmission component 1304 may transmit, to the UE, a second DCI communication associated with the sDCI mode using the second DCI format.

The indication component 1310 may indicate that the one or more DCI communications are associated with the mDCI mode based at least in part on only one SRS resource set, of the at least two SRS resource sets, being associated with the DCI format associated with the DCI communications.

The indication component 1310 may indicate that the one or more DCI communications are associated with the sDCI mode based at least in part on two SRS resource sets, of the at least two SRS resource sets, being associated with the DCI format associated with the DCI communications.

The transmission component 1304 may transmit, to the UE, a first DCI communication, of the one or more DCI communications, associated with a first uplink communication, wherein the first DCI communication is associated with the sDCI mode.

The transmission component 1304 may transmit, to the UE, a second DCI communication, of the one or more DCI communications, associated with a second uplink communication that at least partially overlaps, in the time domain, with the first uplink communication, wherein the second DCI communication is associated with the mDCI mode.

The reception component 1302 may receive, from the UE, capability information indicating a capability of the UE to support overlapping uplink communications associated with the sDCI mode and the mDCI mode, wherein transmitting the first DCI communication and the second DCI communication is based at least in part on the capability information.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a UE, comprising: receiving, from a network node, configuration information indicating a configuration of at least two SRS resource sets; receiving one or more DCI communications associated with one or more uplink communications; and receiving, from the network node, an indication of whether the one or more DCI communications are associated with one or both of an sDCI mode or an mDCI mode, wherein the indication is based at least in part on the configuration information.

Aspect 2: The method of Aspect 1, wherein the indication of whether the one or more DCI communications are associated with one or both of the sDCI mode or the mDCI mode indicates whether one or more fields are included in the one or more DCI communications.

Aspect 3: The method of Aspect 2, wherein the one or more fields include at least one of: an SRS resource set indicator field, a second SRS resource indicator field, a second transmitted precoding matrix indicator field, or a second phase tracking reference signal and demodulation reference signal association field.

Aspect 4: The method of any of Aspects 1-3, wherein the indication of whether the one or more DCI communications are associated with one or both of the sDCI mode or the mDCI mode is based at least in part on whether the configuration information configures an active BWP with at least two CORESETs associated with different CORESET pool index values.

Aspect 5: The method of Aspect 4, further comprising determining that the one or more DCI communications are associated with the mDCI mode based at least in part on the configuration information configuring the active BWP with the at least two CORESETs associated with the different CORESET pool index values.

Aspect 6: The method of Aspect 4, further comprising determining that the one or more DCI communications are associated with the sDCI mode based at least in part on the configuration information refraining from configuring the active BWP with the at least two CORESETs associated with the different CORESET pool index values.

Aspect 7: The method of any of Aspects 1-6, further comprising receiving, from the network node, a simultaneous-transmission configuration associated with the indication of whether the one or more DCI communications are associated with one or both of the sDCI mode or the mDCI mode.

Aspect 8: The method of Aspect 7, wherein the simultaneous-transmission configuration is associated with at least one of a bandwidth part or a component carrier.

Aspect 9: The method of any of Aspects 7-8, further comprising determining that the one or more DCI communications are associated with the mDCI mode based at least in part on the simultaneous-transmission configuration indicating that the mDCI mode is enabled for simultaneous transmissions.

Aspect 10: The method of any of Aspects 7-8, further comprising determining that the one or more DCI communications are associated with the sDCI mode based at least in part on the simultaneous-transmission configuration indicating the mDCI mode is not enabled for simultaneous transmissions and the simultaneous-transmission configuration indicating at least one of: a spatial domain multiplexing mode is enabled for simultaneous transmissions, a frequency domain multiplexing mode is enabled for simultaneous transmissions, or a single frequency network mode is enabled for simultaneous transmissions.

Aspect 11: The method of any of Aspects 7-10, wherein the simultaneous-transmission configuration is associated with at least one DCI format.

Aspect 12: The method of Aspect 11, wherein the simultaneous-transmission configuration indicates that a first DCI format is associated with the mDCI mode, and wherein the simultaneous-transmission configuration indicates that a second DCI format, different from the first DCI format, is associated with the sDCI mode.

Aspect 13: The method of Aspect 12, further comprising: determining that a first DCI communication is associated with the mDCI mode based at least in part on the first DCI communication being associated with the first DCI format; and determining that a second DCI communication is associated with the sDCI mode based at least in part on the second DCI communication being associated with the second DCI format.

Aspect 14: The method of any of Aspects 1-13, wherein the indication of whether the one or more DCI communications are associated with one or both of the sDCI mode or the mDCI mode is based at least in part on whether two SRS resource sets, of the at least two SRS resource sets, are associated with a DCI format associated with the one or more DCI communications.

Aspect 15: The method of Aspect 14, further comprising determining that the one or more DCI communications are associated with the mDCI mode based at least in part on only one SRS resource set, of the at least two SRS resource sets, being associated with the DCI format associated with the DCI communications.

Aspect 16: The method of Aspect 14, further comprising determining that the one or more DCI communications are associated with the sDCI mode based at least in part on two SRS resource sets, of the at least two SRS resource sets, being associated with the DCI format associated with the DCI communications.

Aspect 17: The method of any of Aspects 1-16, further comprising: receiving, from the network node, a first DCI communication, of the one or more DCI communications, associated with a first uplink communication, wherein the first DCI communication is associated with the sDCI mode; and receiving, from the network node, a second DCI communication, of the one or more DCI communications, associated with a second uplink communication that at least partially overlaps, in the time domain, with the first uplink communication, wherein the second DCI communication is associated with the mDCI mode.

Aspect 18: The method of Aspect 17, wherein the first DCI communication indicates that two SRS resource sets, of the at least two SRS resource sets, are associated with the first uplink communication.

Aspect 19: The method of Aspect 18, wherein the first DCI communication indicates that the two SRS resource sets are associated with the first uplink communication via an SRS resource set indicator field associated with the first DCI communication indicating at least one of codepoint 10 or codepoint 11.

Aspect 20: The method of any of Aspects 17-19, further comprising transmitting, to the network node, capability information indicating a capability to support overlapping uplink communications associated with the sDCI mode and the mDCI mode, wherein receiving the first DCI communication and the second DCI communication is based at least in part on the capability information.

Aspect 21: The method of any of Aspects 17-20, wherein the first DCI communication is associated with a first CORESET pool index value, and wherein the second DCI communication is associated with a second CORESET pool index value.

Aspect 22: The method of Aspect 21, wherein the first CORESET pool index value is associated with two SRS resource sets, of the at least two SRS resource sets, and wherein the second CORESET pool index value is associated with the two SRS resource sets, of the at least two SRS resource sets.

Aspect 23: The method of Aspect 21, wherein the first CORESET pool index value is associated with a first set of two SRS resource sets, of the at least two SRS resource sets, and wherein the second CORESET pool index value is associated with a second set of two SRS resource sets, of the at least two SRS resource sets.

Aspect 24: A method of wireless communication performed by network node, comprising: transmitting, to a UE, configuration information indicating a configuration of at least two SRS resource sets; transmitting, to the UE, one or more DCI communications associated with one or more uplink communications; and indicating, to the UE, whether the one or more DCI communications are associated with one or both of an sDCI mode or an mDCI mode based at least in part on the configuration information, wherein the indication is based at least in part on the configuration information.

Aspect 25: The method of Aspect 24, wherein indicating whether the one or more DCI communications are associated with one or both of the sDCI mode or the mDCI mode further indicates whether one or more fields are included in the one or more DCI communications.

Aspect 26: The method of Aspect 25, wherein the one or more fields include at least one of: an SRS resource set indicator field, a second SRS resource indicator field, a second transmitted precoding matrix indicator field, or a second phase tracking reference signal and demodulation reference signal association field.

Aspect 27: The method of any of Aspects 24-26, wherein indicating whether the one or more DCI communications are associated with one or both of the sDCI mode or the mDCI mode is based at least in part on whether the configuration information configures an active BWP with at least two CORESETs associated with different CORESET pool index values.

Aspect 28: The method of Aspect 27, further comprising indicating that the one or more DCI communications are associated with the mDCI mode based at least in part on the configuration information configuring the active BWP with the at least two CORESETs associated with the different CORESET pool index values.

Aspect 29: The method of Aspect 27, further comprising indicating that the one or more DCI communications are associated with the sDCI mode based at least in part on the configuration information refraining from configuring the active BWP with the at least two CORESETs associated with the different CORESET pool index values.

Aspect 30: The method of any of Aspects 24-29, further comprising transmitting, to the UE, a simultaneous-transmission configuration associated with indicating whether the one or more DCI communications are associated with one or both of the sDCI mode or the mDCI mode.

Aspect 31: The method of Aspect 30, wherein the simultaneous-transmission configuration is associated with at least one of a bandwidth part or a component carrier.

Aspect 32: The method of any of Aspects 30-31, further comprising indicating that the one or more DCI communications are associated with the mDCI mode based at least in part on the simultaneous-transmission configuration indicating that the mDCI mode is enabled for simultaneous transmissions.

Aspect 33: The method of any of Aspects 30-31, further comprising indicating that the one or more DCI communications are associated with the sDCI mode based at least in part on the simultaneous-transmission configuration indicating that a simultaneous transmission mode is not enabled.

Aspect 34: The method of any of Aspects 30-31, further comprising indicating that the one or more DCI communications are associated with the sDCI mode based at least in part on the simultaneous-transmission configuration indicating at least one of: a spatial domain multiplexing mode is enabled for simultaneous transmissions, a frequency domain multiplexing mode is enabled for simultaneous transmissions, or a single frequency network mode is enabled for simultaneous transmissions.

Aspect 35: The method of any of Aspects 30-34, wherein the simultaneous-transmission configuration is associated with at least one DCI format.

Aspect 36: The method of Aspect 35, wherein the simultaneous-transmission configuration indicates that a first DCI format is associated with the mDCI mode, and wherein the simultaneous-transmission configuration indicates that a second DCI format, different from the first DCI format, is associated with the sDCI mode.

Aspect 37: The method of Aspect 36, further comprising: transmitting, to the UE, a first DCI communication associated with the mDCI mode using the first DCI format; and transmitting, to the UE, a second DCI communication associated with the sDCI mode using the second DCI format.

Aspect 38: The method of any of Aspects 24-37, wherein indicating whether the one or more DCI communications are associated with one or both of the sDCI mode or the mDCI mode is based at least in part on whether two SRS resource sets, of the at least two SRS resource sets, are associated with a DCI format associated with the one or more DCI communications.

Aspect 39: The method of Aspect 38, further comprising indicating that the one or more DCI communications are associated with the mDCI mode based at least in part on only one SRS resource set, of the at least two SRS resource sets, being associated with the DCI format associated with the DCI communications.

Aspect 40: The method of Aspect 38, further comprising indicating that the one or more DCI communications are associated with the sDCI mode based at least in part on two SRS resource sets, of the at least two SRS resource sets, being associated with the DCI format associated with the DCI communications.

Aspect 41: The method of any of Aspects 24-40, further comprising: transmitting, to the UE, a first DCI communication, of the one or more DCI communications, associated with a first uplink communication, wherein the first DCI communication is associated with the sDCI mode; and transmitting, to the UE, a second DCI communication, of the one or more DCI communications, associated with a second uplink communication that at least partially overlaps, in the time domain, with the first uplink communication, wherein the second DCI communication is associated with the mDCI mode.

Aspect 42: The method of Aspect 41, wherein the first DCI communication indicates that two SRS resource sets, of the at least two SRS resource sets, are associated with the first uplink communication.

Aspect 43: The method of Aspect 42, wherein the first DCI communication indicates that the two SRS resource sets are associated with the first uplink communication via an SRS resource set indicator field associated with the first DCI communication indicating at least one of codepoint 10 or codepoint 11.

Aspect 44: The method of any of Aspects 41-43, further comprising receiving, from the UE, capability information indicating a capability of the UE to support overlapping uplink communications associated with the sDCI mode and the mDCI mode, wherein transmitting the first DCI communication and the second DCI communication is based at least in part on the capability information.

Aspect 45: The method of any of Aspects 41-44, wherein the first DCI communication is associated with a first CORESET pool index value, and wherein the second DCI communication is associated with a second CORESET pool index value.

Aspect 46: The method of Aspect 45, wherein the first CORESET pool index value is associated with two SRS resource sets, of the at least two SRS resource sets, and wherein the second CORESET pool index value is associated with the two SRS resource sets, of the at least two SRS resource sets.

Aspect 47: The method of Aspect 45, wherein the first CORESET pool index value is associated with a first set of two SRS resource sets, of the at least two SRS resource sets, and wherein the second CORESET pool index value is associated with a second set of two SRS resource sets, of the at least two SRS resource sets.

Aspect 48: An apparatus for wireless communication at a device, comprising a processor; memory coupled with the processor; and instructions stored in the memory and executable by the processor to cause the apparatus to perform the method of one or more of Aspects 1-23.

Aspect 49: A device for wireless communication, comprising a memory and one or more processors coupled to the memory, the one or more processors configured to perform the method of one or more of Aspects 1-23.

Aspect 50: An apparatus for wireless communication, comprising at least one means for performing the method of one or more of Aspects 1-23.

Aspect 51: A non-transitory computer-readable medium storing code for wireless communication, the code comprising instructions executable by a processor to perform the method of one or more of Aspects 1-23.

Aspect 52: A non-transitory computer-readable medium storing a set of instructions for wireless communication, the set of instructions comprising one or more instructions that, when executed by one or more processors of a device, cause the device to perform the method of one or more of Aspects 1-23.

Aspect 53: An apparatus for wireless communication at a device, comprising a processor; memory coupled with the processor; and instructions stored in the memory and executable by the processor to cause the apparatus to perform the method of one or more of Aspects 24-47.

Aspect 54: A device for wireless communication, comprising a memory and one or more processors coupled to the memory, the one or more processors configured to perform the method of one or more of Aspects 24-47.

Aspect 55: An apparatus for wireless communication, comprising at least one means for performing the method of one or more of Aspects 24-47.

Aspect 56: A non-transitory computer-readable medium storing code for wireless communication, the code comprising instructions executable by a processor to perform the method of one or more of Aspects 24-47.

Aspect 57: A non-transitory computer-readable medium storing a set of instructions for wireless communication, the set of instructions comprising one or more instructions that, when executed by one or more processors of a device, cause the device to perform the method of one or more of Aspects 24-47.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:

receive, from a network node, configuration information indicating a configuration of at least two sounding reference signal (SRS) resource sets;

receive one or more downlink control information (DCI) communications associated with one or more uplink communications; and receive, from the network node, an indication of whether the one or more DCI communications are associated with one or both of a single DCI (sDCI) mode or a multiple DCI (mDCI) mode, wherein the indication is based at least in part on the configuration information, and wherein the indication of whether the one or more DCI communications are associated with one or both of the sDCI mode or the mDCI mode indicates whether one or more fields are included in the one or more DCI communications.

2. The UE of claim 1, wherein the one or more fields include at least one of:

an SRS resource set indicator field, a second SRS resource indicator field, a second transmitted precoding matrix indicator field, or a second phase tracking reference signal and demodulation reference signal association field.

3. The UE of claim 1, wherein the indication of whether the one or more DCI communications are associated with one or both of the sDCI mode or the mDCI mode is based at least in part on whether the configuration information configures an active bandwidth part (BWP) with at least two control resource sets (CORESETs) associated with different CORESET pool index values.

4. The UE of claim 3, wherein the one or more processors are further configured to determine that the one or more DCI communications are associated with the mDCI mode based at least in part on the configuration information configuring the active BWP with the at least two CORESETs associated with the different CORESET pool index values.

5. The UE of claim 3, wherein the one or more processors are further configured to determine that the one or more DCI communications are associated with the sDCI mode based at least in part on the configuration information refraining from configuring the active BWP with the at least two CORESETs associated with the different CORESET pool index values.

6. The UE of claim 1, wherein the one or more processors are further configured to receive, from the network node, a simultaneous-transmission configuration associated with the indication of whether the one or more DCI communications are associated with one or both of the sDCI mode or the mDCI mode.

7. The UE of claim 6, wherein the simultaneous-transmission configuration is associated with at least one of a bandwidth part or a component carrier.

8. The UE of claim 6, wherein the one or more processors are further configured to determine that the one or more DCI communications are associated with the mDCI mode based at least in part on the simultaneous-transmission configuration indicating that the mDCI mode is enabled for simultaneous transmissions.

9. The UE of claim 6, wherein the one or more processors are further configured to determine that the one or more DCI communications are associated with the sDCI mode based at least in part on the simultaneous-transmission configuration indicating the mDCI mode is not enabled for simultaneous transmissions and the simultaneous-transmission configuration indicating at least one of:

a spatial domain multiplexing mode is enabled for simultaneous transmissions, a frequency domain multiplexing mode is enabled for simultaneous transmissions, or a single frequency network mode is enabled for simultaneous transmissions.

10. The UE of claim 6, wherein the simultaneous-transmission configuration is associated with at least one DCI format.

11. The UE of claim 10, wherein the simultaneous-transmission configuration indicates that a first DCI format is associated with the mDCI mode, and wherein the simultaneous-transmission configuration indicates that a second DCI format, different from the first DCI format, is associated with the sDCI mode.

12. The UE of claim 11, wherein the one or more processors are further configured to:

determine that a first DCI communication is associated with the mDCI mode based at least in part on the first DCI communication being associated with the first DCI format; and determine that a second DCI communication is associated with the sDCI mode based at least in part on the second DCI communication being associated with the second DCI format.

13. The UE of claim 1, wherein the indication of whether the one or more DCI communications are associated with one or both of the sDCI mode or the mDCI mode is based at least in part on whether two SRS resource sets, of the at least two SRS resource sets, are associated with a DCI format associated with the one or more DCI communications.

14. The UE of claim 13, wherein the one or more processors are further configured to determine that the one or more DCI communications are associated with the mDCI mode based at least in part on only one SRS resource set, of the at least two SRS resource sets, being associated with the DCI format associated with the one or more DCI communications.

15. The UE of claim 13, wherein the one or more processors are further configured to determine that the one or more DCI communications are associated with the sDCI mode based at least in part on two SRS resource sets, of the at least two SRS resource sets, being associated with the DCI format associated with the one or more DCI communications.

16. The UE of claim 1, wherein the one or more processors are further configured to:

receive, from the network node, a first DCI communication, of the one or more DCI communications, associated with a first uplink communication, wherein the first DCI communication is associated with the sDCI mode; and receive, from the network node, a second DCI communication, of the one or more DCI communications, associated with a second uplink communication that at least partially overlaps, in a time domain, with the first uplink communication, wherein the second DCI communication is associated with the mDCI mode.

17. The UE of claim 16, wherein the first DCI communication indicates that two SRS resource sets, of the at least two SRS resource sets, are associated with the first uplink communication.

18. The UE of claim 17, wherein the first DCI communication indicates that the two SRS resource sets are associated with the first uplink communication via an SRS resource set indicator field associated with the first DCI communication indicating at least one of codepoint 10 or codepoint 11.

19. The UE of claim 16, wherein the one or more processors are further configured to transmit, to the network node, capability information indicating a capability to support overlapping uplink communications associated with the sDCI mode and the mDCI mode, wherein receiving the first DCI communication and the second DCI communication is based at least in part on the capability information.

20. The UE of claim 16, wherein the first DCI communication is associated with a first control resource set (CORESET) pool index value, and wherein the second DCI communication is associated with a second CORESET pool index value.

21. The UE of claim 20, wherein the first CORESET pool index value is associated with two SRS resource sets, of the at least two SRS resource sets, and wherein the second CORESET pool index value is associated with the two SRS resource sets, of the at least two SRS resource sets.

22. The UE of claim 20, wherein the first CORESET pool index value is associated with a first set of two SRS resource sets, of the at least two SRS resource sets, and wherein the second CORESET pool index value is associated with a second set of two SRS resource sets, of the at least two SRS resource sets.

23. A network node for wireless communication, comprising:
one or more memories; and
one or more processors, coupled to the one or more memories, configured to:
  transmit, to a user equipment (UE), configuration information indicating a configuration of at least two sounding reference signal (SRS) resource sets;
  transmit, to the UE, one or more downlink control information (DCI) communications associated with one or more uplink communications; and
  indicate, to the UE, whether the one or more DCI communications are associated with one or both of a single DCI (sDCI) mode or a multiple DCI (mDCI) mode based at least in part on the configuration information, wherein the indication is based at least in part on the configuration information, and wherein the indication of whether the one or more DCI communications are associated with one or both of the sDCI mode or the mDCI mode indicates whether one or more fields are included in the one or more DCI communications.

24. The network node of claim 23, wherein the one or more fields include at least one of:
an SRS resource set indicator field,
a second SRS resource indicator field,
a second transmitted precoding matrix indicator field, or a second phase tracking reference signal and demodulation reference signal association field.

25. A method of wireless communication performed by a user equipment (UE), comprising:
receiving, from a network node, configuration information indicating a configuration of at least two sounding reference signal (SRS) resource sets;
receiving one or more downlink control information (DCI) communications associated with one or more uplink communications; and
receiving, from the network node, an indication of whether the one or more DCI communications are associated with one or both of a single DCI (sDCI) mode or a multiple DCI (mDCI) mode, wherein the indication is based at least in part on the configuration information, and wherein the indication of whether the one or more DCI communications are associated with one or both of the sDCI mode or the mDCI mode indicates whether one or more fields are included in the one or more DCI communications.

26. The method of claim 25, wherein the indication of whether the one or more DCI communications are associated with one or both of the sDCI mode or the mDCI mode is based at least in part on whether the configuration information configures an active bandwidth part (BWP) with at least two control resource sets (CORESETs) associated with different CORESET pool index values.

27. A method of wireless communication performed by network node, comprising:
transmitting, to a user equipment (UE), configuration information indicating a configuration of at least two sounding reference signal (SRS) resource sets;
transmitting, to the UE, one or more downlink control information (DCI) communications associated with one or more uplink communications; and
indicating, to the UE, whether the one or more DCI communications are associated with one or both of a single DCI (sDCI) mode or a multiple DCI (mDCI) mode based at least in part on the configuration information, wherein the indication is based at least in part on the configuration information, and wherein the indication of whether the one or more DCI communications are associated with one or both of the sDCI mode or the mDCI mode indicates whether one or more fields are included in the one or more DCI communications.

28. The method of claim 27, further comprising transmitting, to the UE, a simultaneous-transmission configuration associated with indicating whether the one or more DCI communications are associated with one or both of the sDCI mode or the mDCI mode.

29. The method of claim 25, wherein the one or more fields include at least one of:
an SRS resource set indicator field,
a second SRS resource indicator field,
a second transmitted precoding matrix indicator field, or
a second phase tracking reference signal and demodulation reference signal association field.

30. The method of claim 25, wherein the indication of whether the one or more DCI communications are associated with one or both of the sDCI mode or the mDCI mode is based at least in part on whether the configuration information configures an active bandwidth part (BWP) with at least two control resource sets (CORESETs) associated with different CORESET pool index values.

*    *    *    *    *